April 6, 1937.  M. DAVIS  2,075,802
PRODUCTION OF COMPLEX SOUNDS
Filed Jan. 26, 1933  12 Sheets-Sheet 1

INVENTOR
Merlin Davis.
BY
ATTORNEY

April 6, 1937.　　　　M. DAVIS　　　　2,075,802
PRODUCTION OF COMPLEX SOUNDS
Filed Jan. 26, 1933　　12 Sheets-Sheet 2

INVENTOR
Merlin Davis.
BY
ATTORNEY

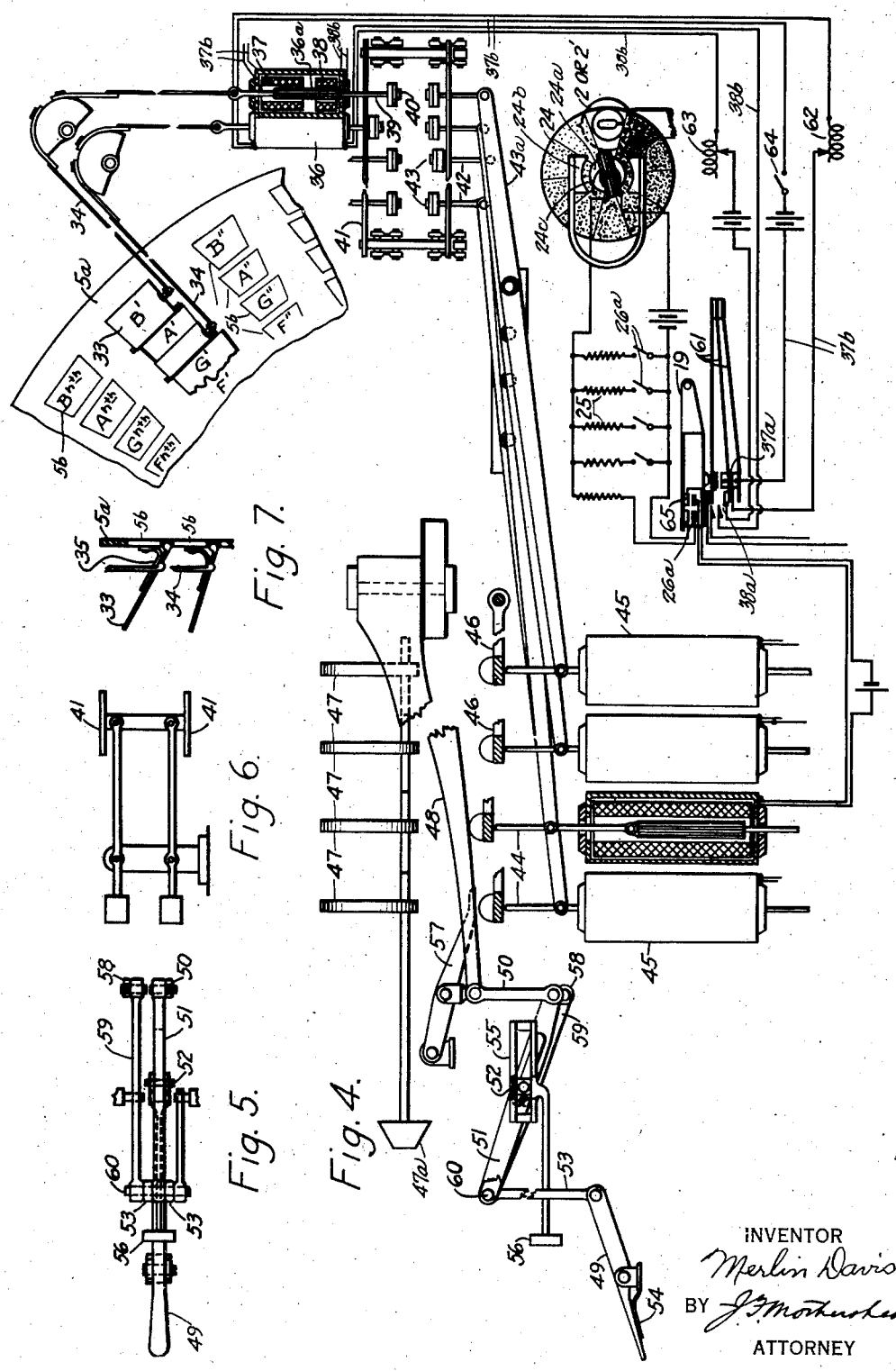

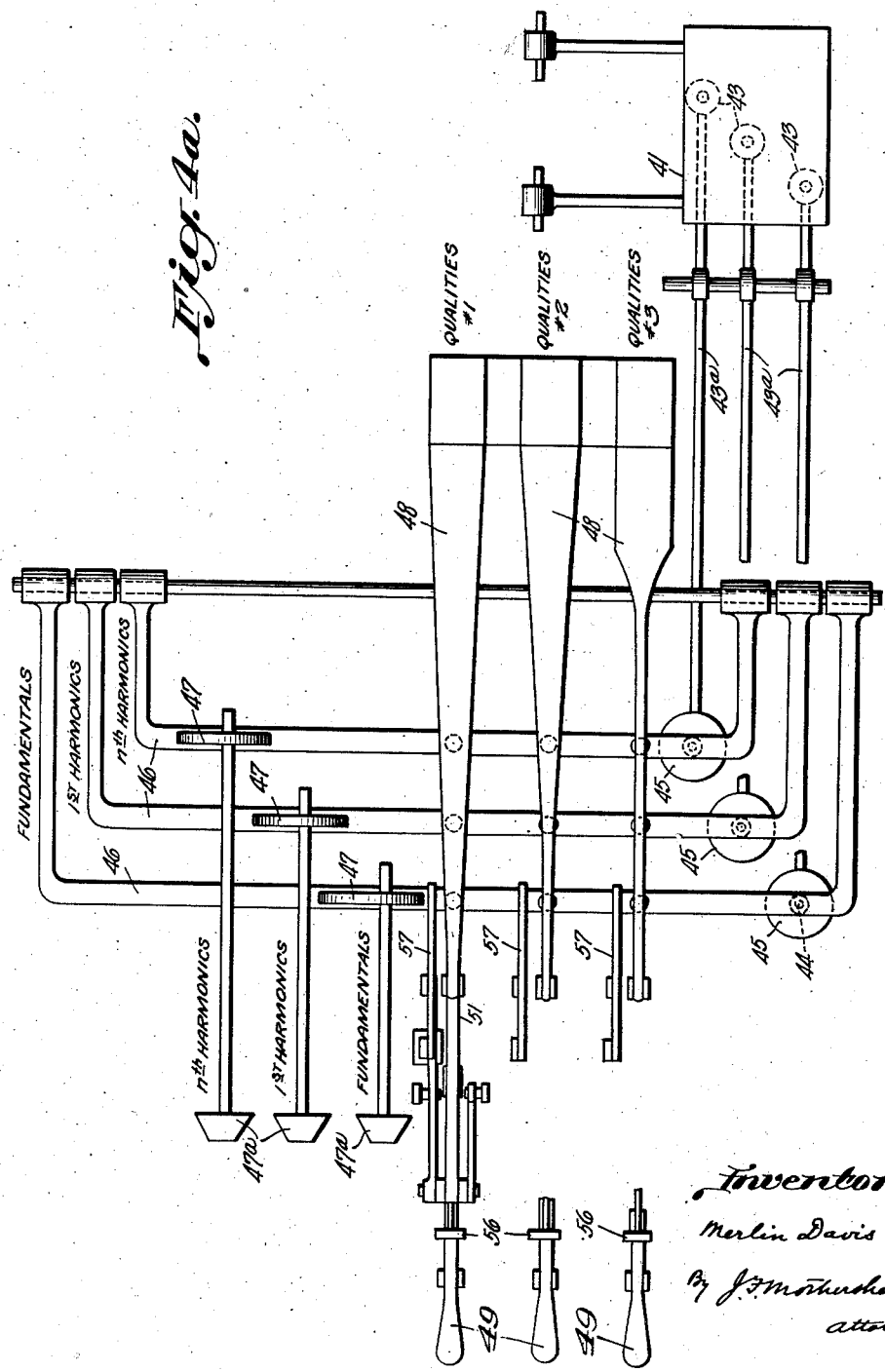

April 6, 1937.　　　　　M. DAVIS　　　　　2,075,802
PRODUCTION OF COMPLEX SOUNDS
Filed Jan. 26, 1933　　　12 Sheets—Sheet 5
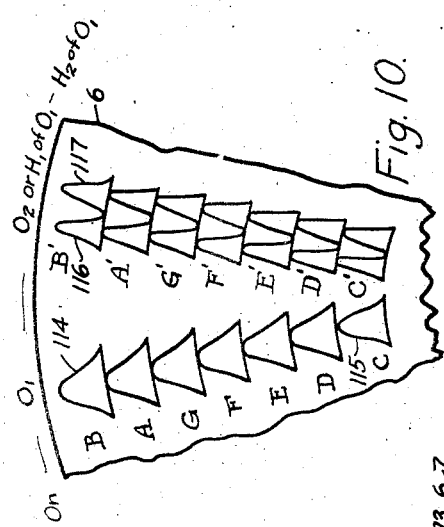
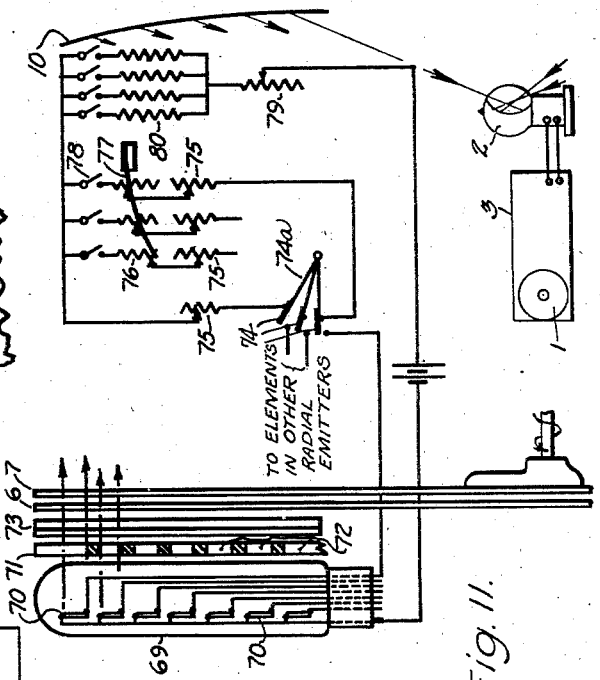
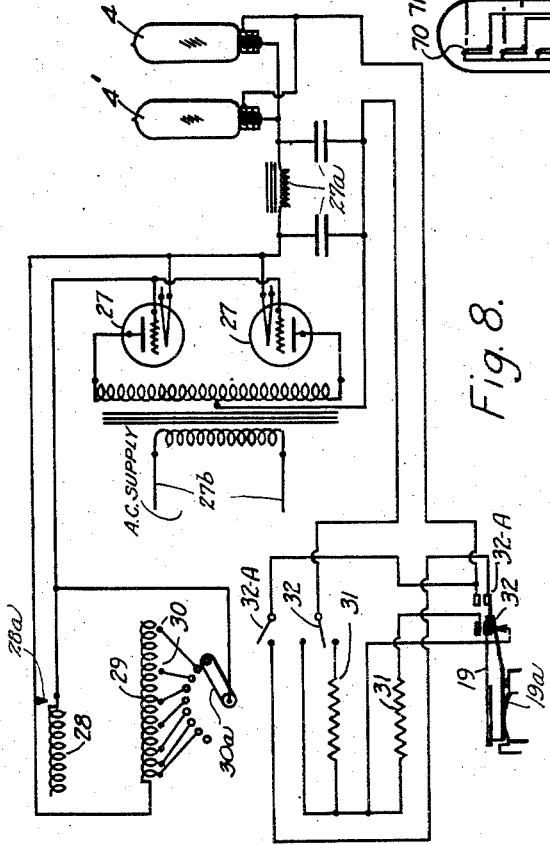
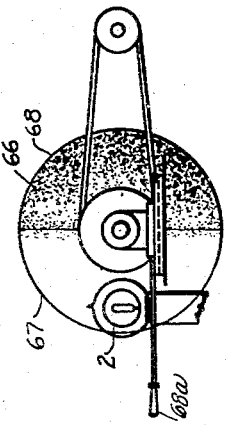
Inventor
Merlin Davis.
By J. F. Motherhead
Attorney

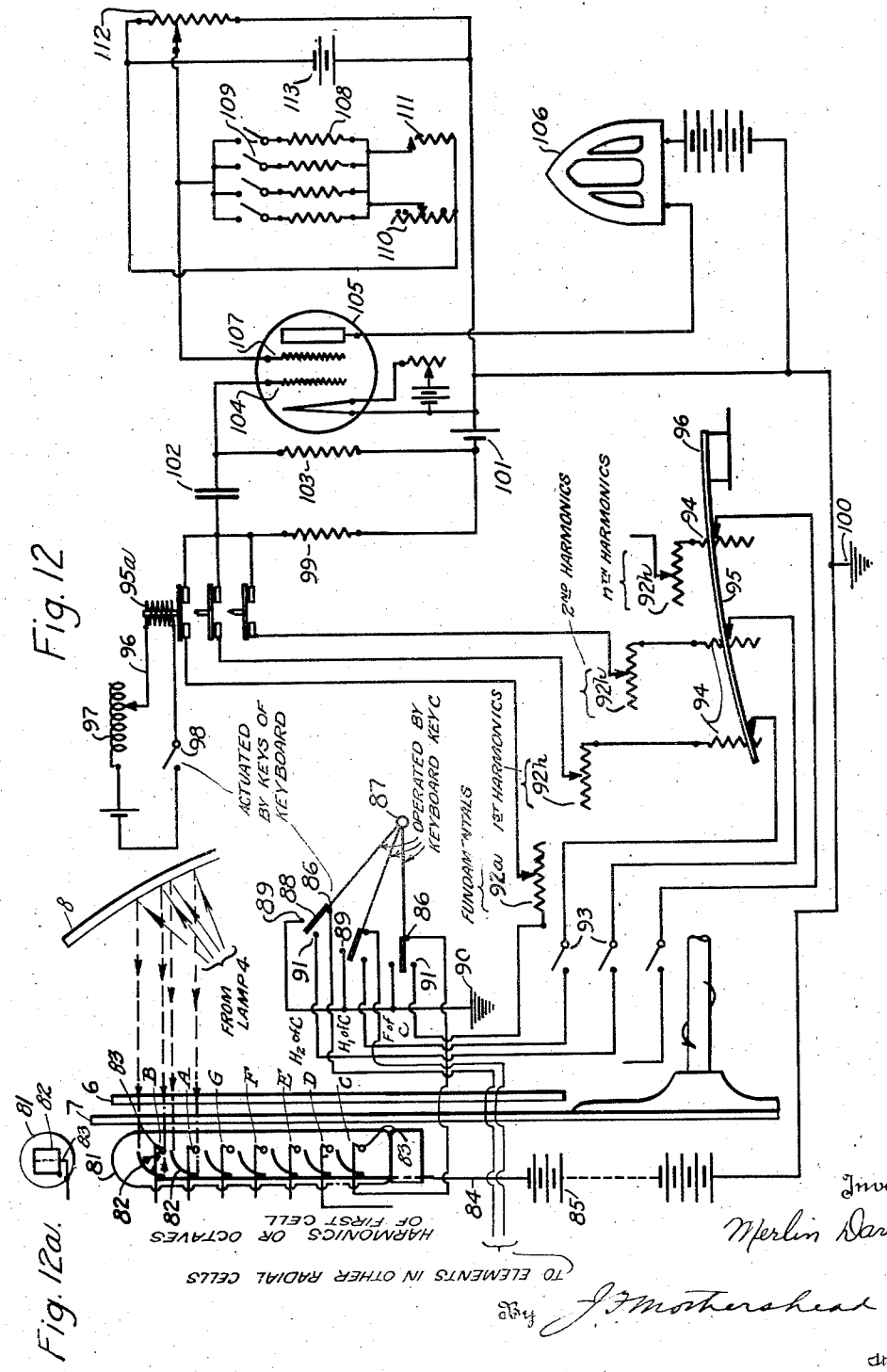

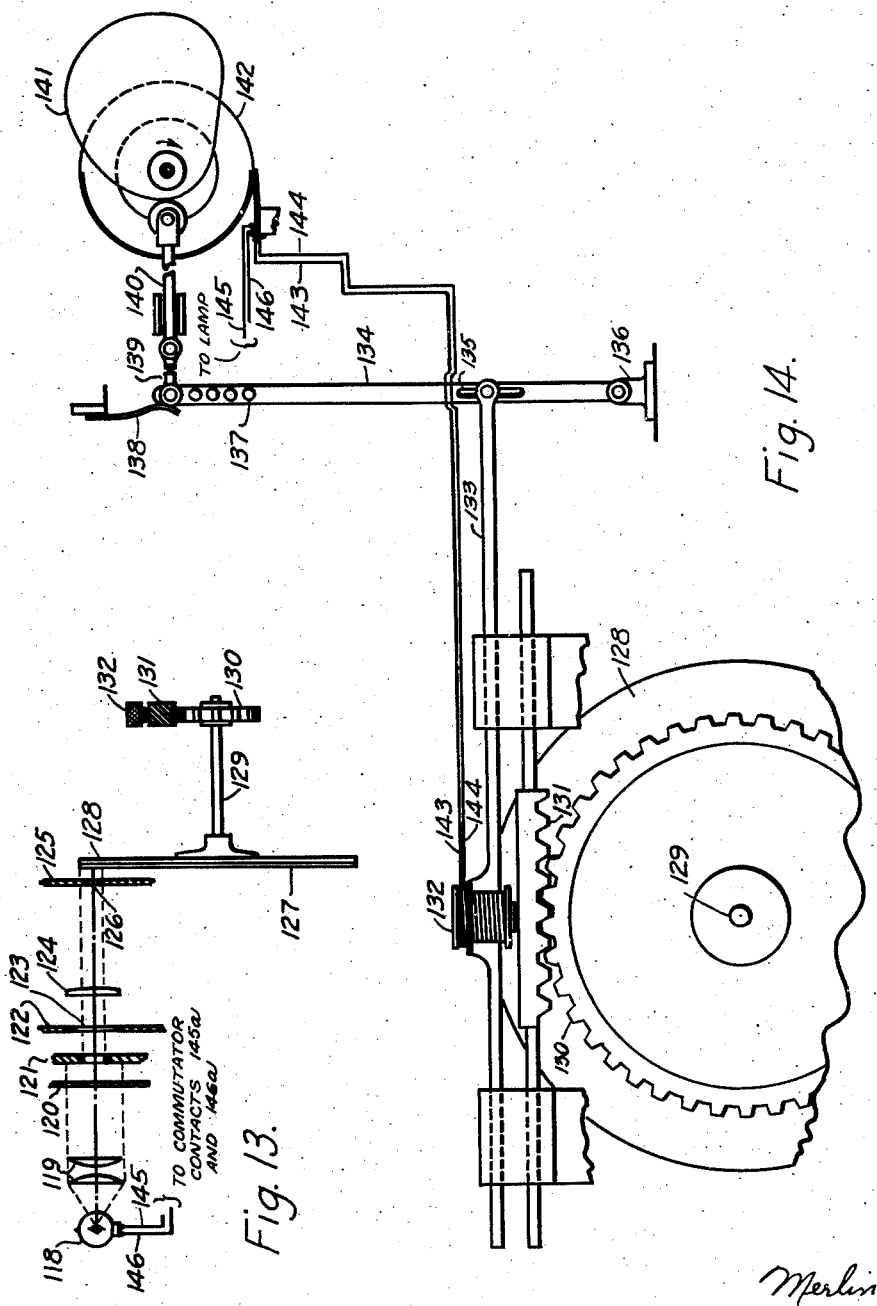

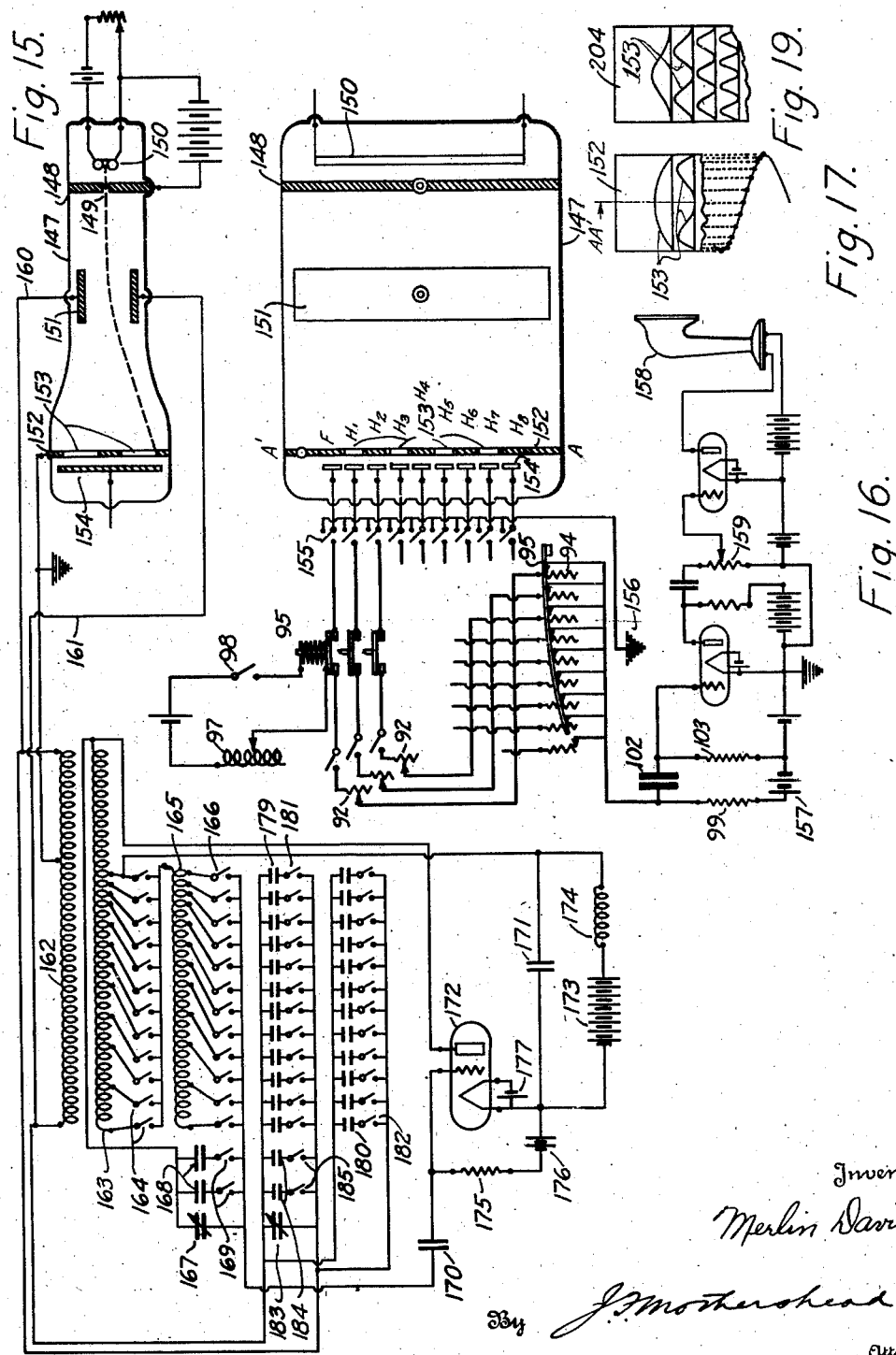

April 6, 1937.  M. DAVIS  2,075,802
PRODUCTION OF COMPLEX SOUNDS
Filed Jan. 26, 1933   12 Sheets-Sheet 9
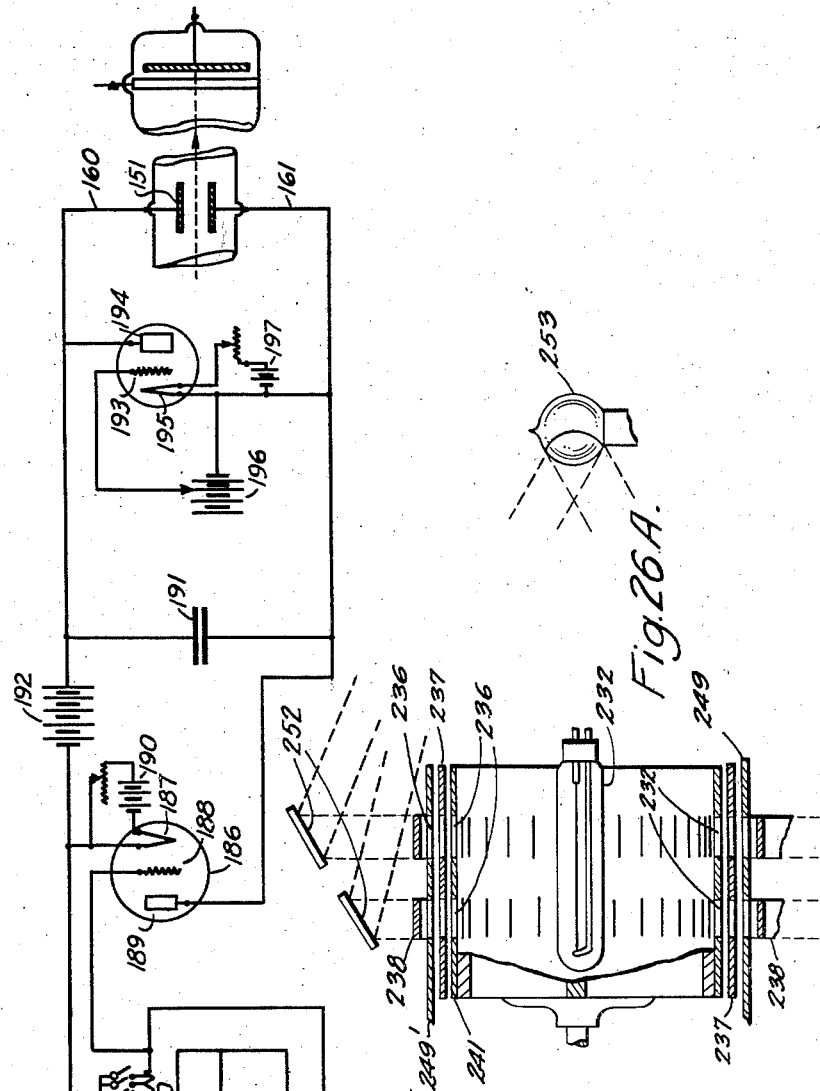
INVENTOR
Merlin Davis.
BY
ATTORNEY

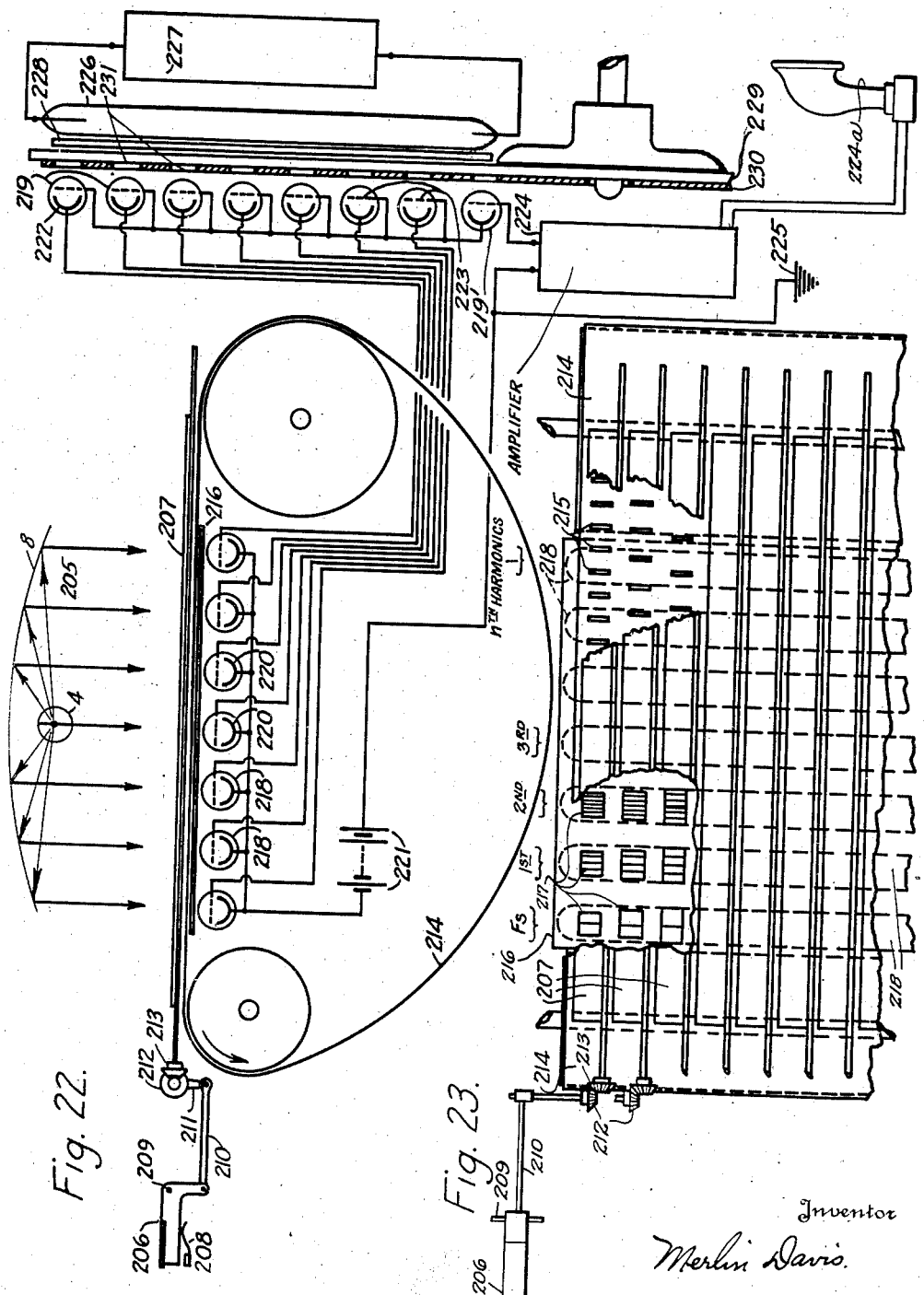

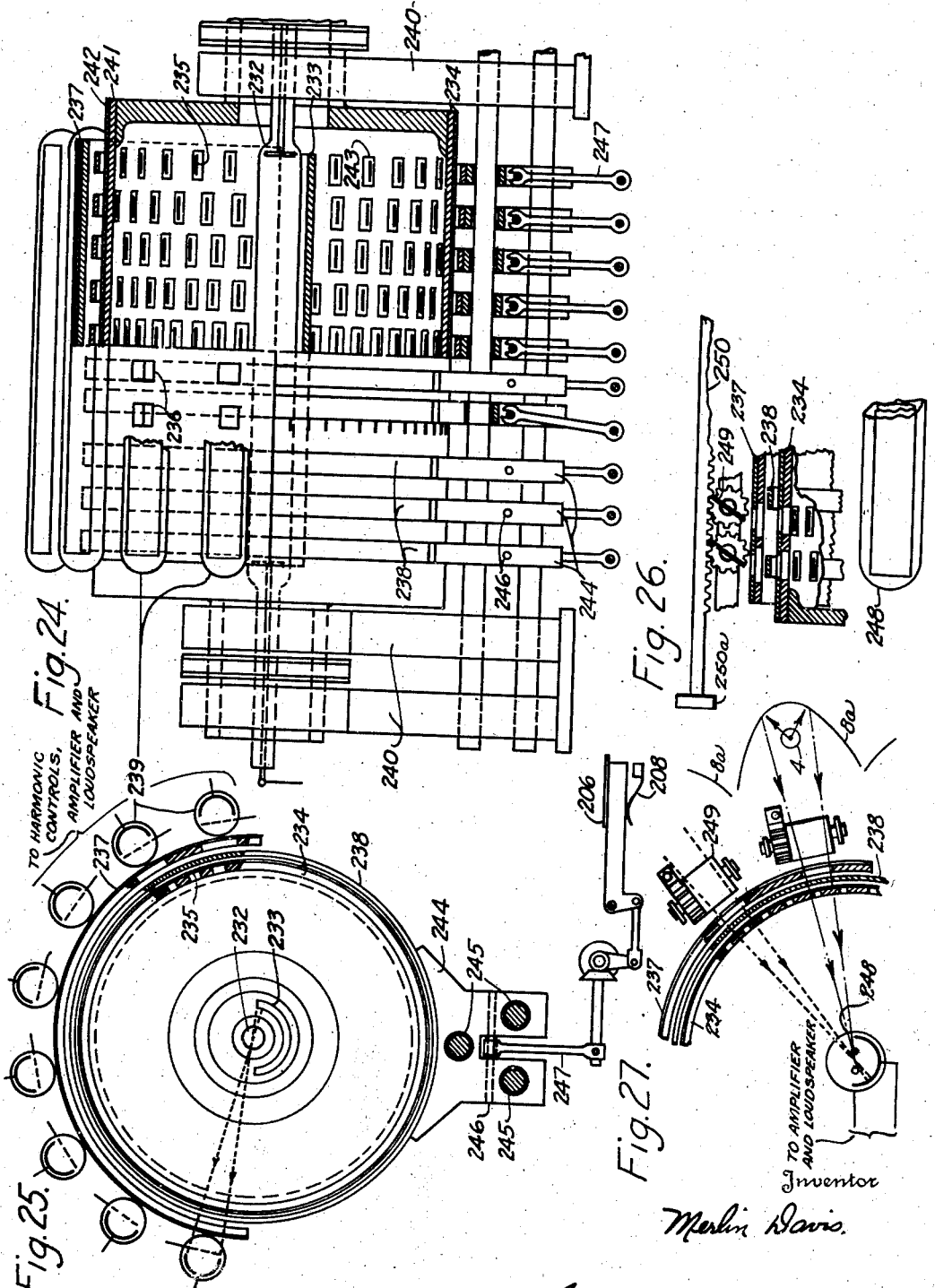

April 6, 1937.  M. DAVIS  2,075,802
PRODUCTION OF COMPLEX SOUNDS
Filed Jan. 26, 1933  12 Sheets-Sheet 12
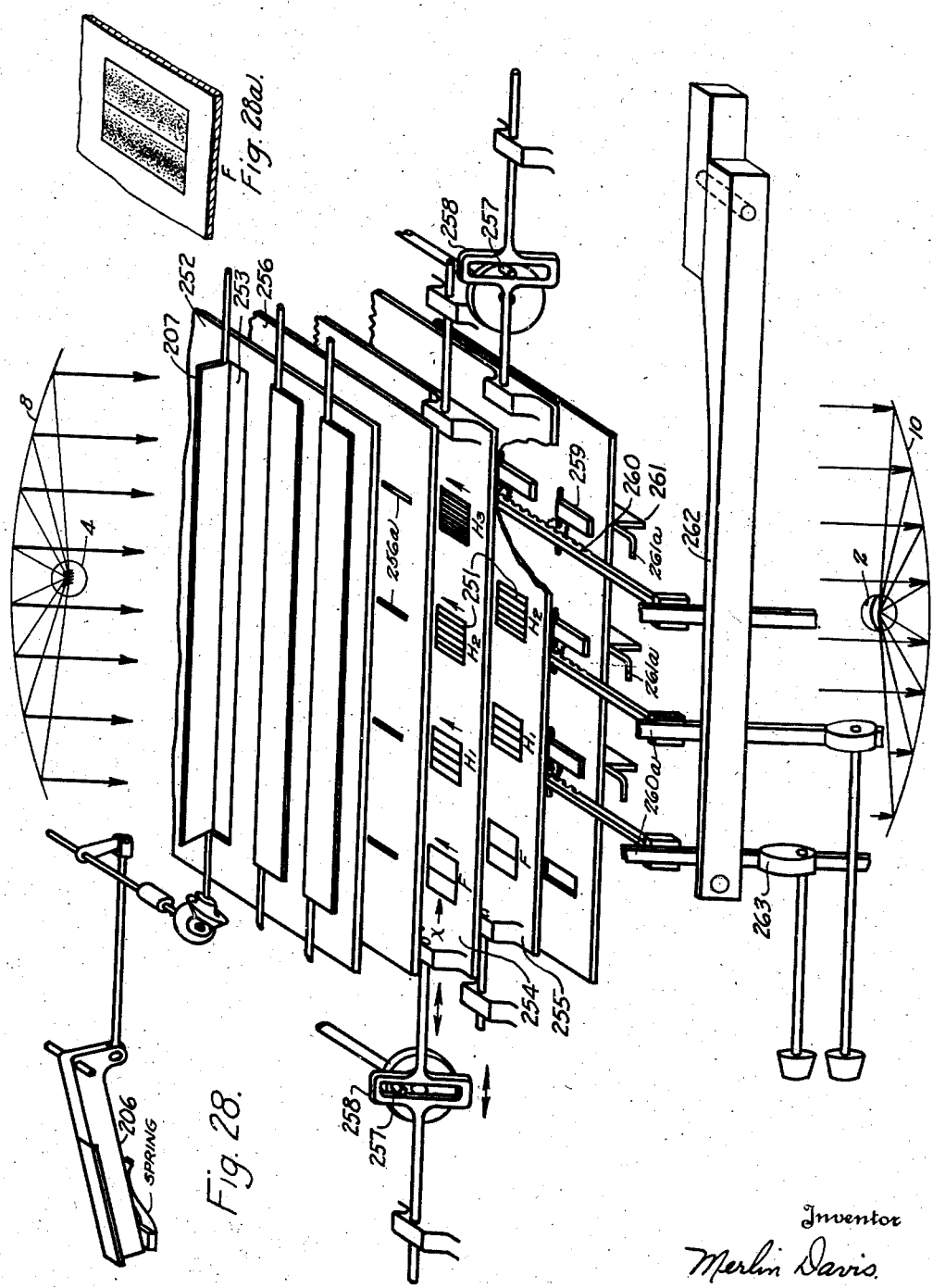
Inventor
Merlin Davis.
By J. F. Mothershead
Attorney Patented Apr. 6, 1937

2,075,802

UNITED STATES PATENT OFFICE 2,075,802

PRODUCTION OF COMPLEX SOUNDS

Merlin Davis, Milton, Pa.

Application January 26, 1933, Serial No. 653,684

88 Claims. (Cl. 84—1)

(Granted under the act of March 3, 1883, as amended April 30, 1928; 370 O. G. 757)

The invention described herein may be manufactured and used by or for the Government of the United States for governmental purposes only without the payment of any royalty thereon.

My invention relates to an instrument of underlying electrical principles for the production of complex sounds. As a musical instrument it offers complete control of quality or timbre during the rendition of a musical composition with limitless tonal variations at the immediate will of the operator. The scale in just temperament may be played in the various keys of the major and minor modes upon a standard piano keyboard. It may be adapted for new scale formations.

Whenever any key of the keyboard of my instrument is struck, there is sounded along with the pitch or frequency which is apparent, or fundamental, a number of other musical sounds whose frequencies of vibration are 1, 2, 3, 4, 5, 6, 7 etc. times the fundamental frequency, respectively. The volume or loudness of these harmonics, so called, is made such that each may be independently controlled or in such a manner that they bear certain governable relations to each other. By regulating the intensity of these harmonic tones which accompany the fundamental the quality or timbre of the combined tone is varied such that existing instruments may be simulated or new tones originated which it may be impossible to produce by means of prior musical instruments. As a further means of changing the quality it is arranged that after a note is struck some of its harmonics, as desired, may be made to swell in to volume before others. The degree of the time lag in the retarded harmonics is at the control of the operator.

By means of my invention tremolo effects are made possible. An intensity control scale of sensibly equal gradations is a feature; while execution is improved by means for automatically maintaining a constant volume of sound as the number of notes to a chord is increased.

An instrument with a fixed keyboard such as a piano would require seven keyboards, considering the major mode only, to effect the true pitch relation required for sounding perfectly consonant chords. With my electrical instrument one fixed keyboard is employed while still preserving the true pitch scale relations by means for shifting, in effect, this keyboard to the others just mentioned by the use of key signature stops. If a piano were built using the just tempered scale with the seven keyboards, as outlined, each of these would be divided into groups of seven keys or octaves whose notes would be double the frequency of their corresponding predecessor. The vibration frequency of the seven keys of each such octave group, comprising the scale, would each have a frequency which would be a definite multiple of the lowest note of the group, called the key note. These same definite multiples of a key note would apply in each group for all the keyboards. The vibration frequency of the notes in the various keyboards would differ. The first would start in the bass with an established standard pitch while the others would each successively have its lowest note of a group one degree higher in the scale. The pitches on the seven manuals would correspond to those of the major key signatures. Such a plural keyboard instrument would naturally be too cumbersome. These manuals are condensed into one on the practical piano thereby deviating somewhat from the pitch relation required for true harmony. Such a compromise keyboard necessitates the introduction of the musical notation of "key signature" to facilitate execution. The use of the key signature stops in my electrical instrument eliminates the need for keeping a signature in mind. This electrical instrument is not limited to the use of the intervals to which we are accustomed in the equal or just tempered scales but would allow other scale formations to be employed with the same ease of operation.

For the purpose of illustration a plurality of forms of my device are diagrammatically shown in the accompanying drawings in which:

Figure 1 is a side view showing the general arrangement of one form.

Figure 2 diagrammatically shows a portion of one form of record which I may use.

Figure 4 is a side view, partly in section illustrating one form of shutter operating mechanism.

Figure 4a is a plan view of part of the mechanism shown in Figure 4 and comprising elements 41 to 60 inclusive.

Figure 5 is a detail of a foot pedal and linkage shown in Fig. 4.

Figure 6 is a side view of a stop device shown in Fig. 4.

Figure 7 is a fragmentary side view of two of the shutters and some of their accompanying mechanism which appear in front view in Fig. 4.

Figure 8 shows an intensity control circuit.

Figure 9 is a view of a mechanism for producing tremulous effects.

Figure 10 shows a portion of a record which may be used with other modifications of my invention.

Figure 11 is a diagram showing another form of my invention in which a special form of radiant energy emitter is used.

Figure 12 illustrates a modification provided with means for varying the current passing through multiple photoelectric elements.

Figure 12a shows a top view of the photo-cell 81 illustrated in Figure 12.

Figure 13 is a diagrammatic view of an apparatus for making my shaded records by varying the exposure of a line of light on a revoluble photographic plate.

Figure 14 is a diagrammatic detail view of my apparatus for driving the record used in Figure 13.

In Figures 15 and 16 another modification of my invention having no rotating disks is shown.

Figure 17 illustrates one form of records which I may use with this modification.

Figure 18 is an alternate form of oscillation sweep circuit which may be substituted in the modification illustrated in Figs. 15 and 16.

Figure 19 illustrates another form of my record which I may use with the modification using the oscillation sweep circuit shown in Fig. 18.

Figures 20 and 21 illustrate the wave forms which may be produced by the circuit shown in Fig. 18.

Figure 1:
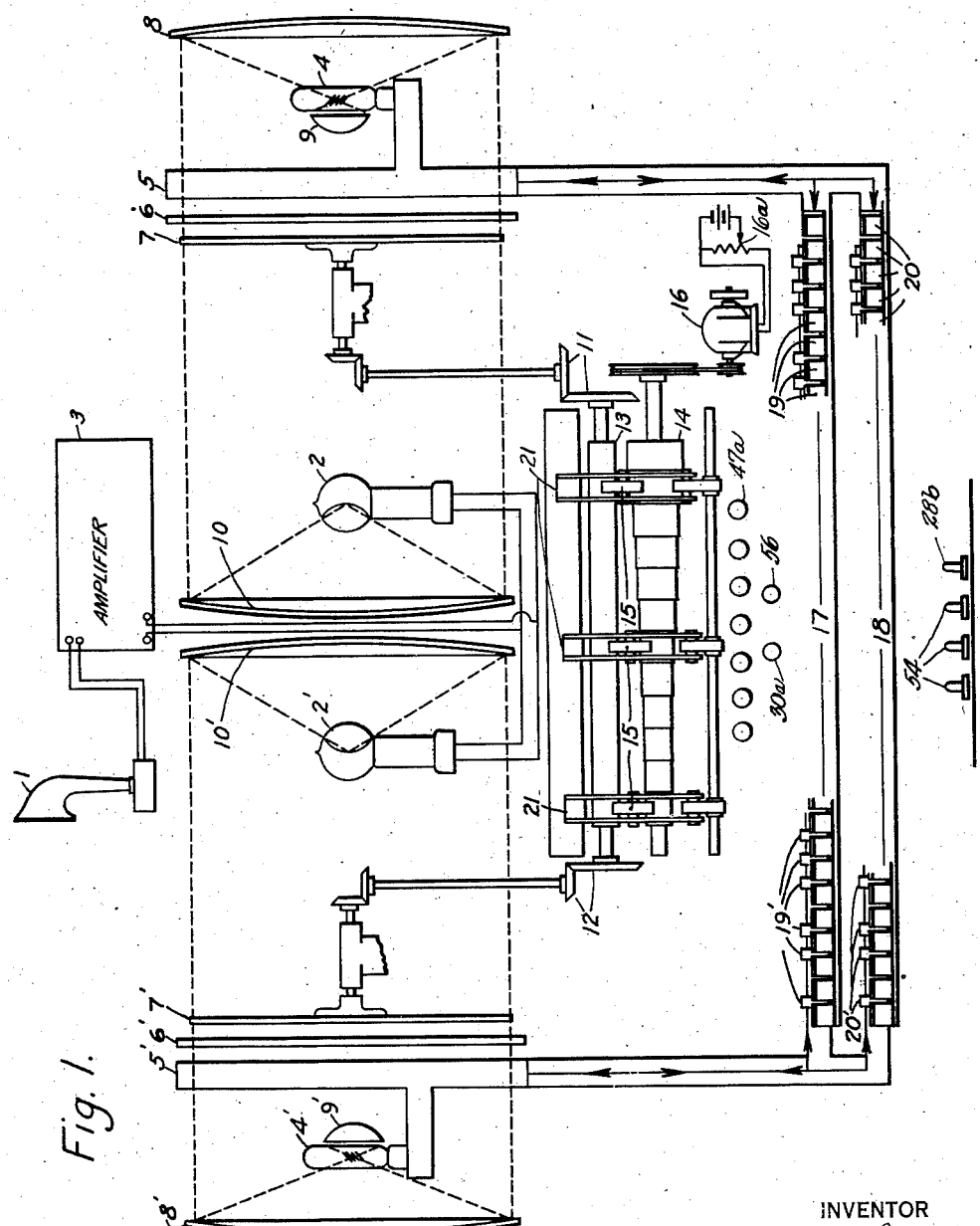
Figure 3:
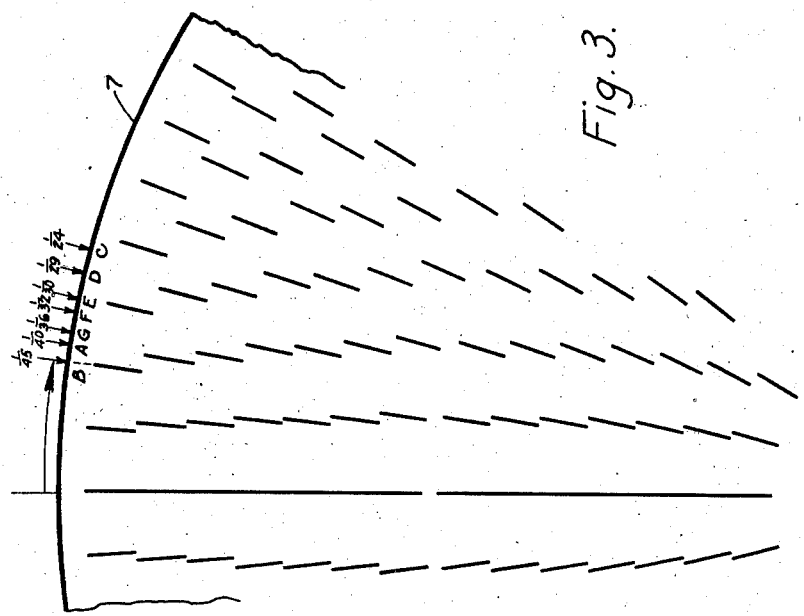
Figure 3 shows a portion of an opaque disk provided with a plurality of narrow transparent radial light openings.

Figure 22 is a side view of a further modification in which the revoluble slotted disk shown in Fig. 1 is replaced by a slotted endless belt or equivalent.

Figure 23 is a plan view of a portion of this modification.

Figure 24 is a view of another modification in which a slotted revoluble cylinder, or equivalent, replaces my slotted disks 7 and 7' shown in Fig. 1.

Figure 25 is an end view of Figure 24.

Figure 26 is a side view of a portion of a further modification, partly in section, of the form shown in Figure 24 but differing in structure by the utilization of two sets of shutters for pitch and tone quality control in place of one set of shutters and a series of light sensitive cells.

Figure 26a is a side view of a modification, partly in section, of the form shown in Figure 26 but differing in structure by the fact that the elongated axially placed light sensitive cell is replaced by a light source.

Figure 27 is an end view of a portion of the modification shown in Figure 26.

Figure 28 is a perspective view of a further modification in which my revoluble slotted disks 7 and 7' are replaced by stationary slotted plates and co-operating reciprocable plates having light transmitting openings.

Figure 28a is an enlarged view of record pattern F shown diagrammatically in Figure 28.

One form of my invention is illustrated in Figures 1 to 9, inclusive, the general assembly being diagrammatically shown in Figure 1.

In this form audible sounds are emitted by a loudspeaker 1, in the output of a circuit such as a capacitance resistance amplifier 3. The input of the amplifier is provided with parallel connected light sensitive elements, shown, as light sensitive cells 2 and 2'.

Light supplied by incandescent lamps 4 and 4' is thrown upon controlling shutter means 5 and 5', shown in detail in Figures 4 and 7. My stationary records 6 and 6' are provided with transparent openings of sine wave proportions or are provided with other means for varying the intensity of light permitted to pass therethrough as by varying the translucency of my record in sine wave proportions as detailed in Fig. 2. Adjacent to my records 6 and 6' and between said records and the cells 2 and 2' I mount revoluble disks 7 and 7' each of which is provided with a plurality of radial slots shown in detail in Fig. 3. My records and slotted disks serve as a means for producing a desired pitch of sound emitted from the loud speaker 1.

The proper illumination of the shutters 5 and 5' may be supplied with the aid of parabolic reflectors 8 and 8' and spherical mirrors 9 and 9' placed on opposite sides of the lamps 4 and 4'.

The parallel rays of light which may be allowed to pass through the shutter means 5 and 5', my records 6 and 6' and my revoluble disks 7 and 7' are concentrated upon the light sensitive cells 2 and 2' by means of a second set of parabolic reflectors 10 and 10'.

The pitch of the sounds produced by my apparatus may also be governed by varying the speed of rotation of my disks 7 and 7' the former being driven through a train of gearing 11 and the latter being driven at a different speed through a similar train of gearing 12, from a shaft 13 a speed change mechanism, shown as a stepped pulley 14 with friction driven pulleys, 15, mounted on a shaft which is driven by a constant speed motor 16 through suitable speed reducing means such as a belt drive, while means 16a may be provided for varying the speed of this motor 16.

The revoluble disks 7 and 7' differ in their number of slots and are operated at different speeds corresponding to the speed ratios for the trains of gearing 11 or 12 respectively. The purpose of providing this dual form of mechanism is to provide pitches other than those present in the major mode. Each concentric series of groups on either record comprises a fundamental pitch (group with single wave), with its octaves and harmonics, respectively. Now the width of any one of these groups in one said concentric series is equal to the equal spacings between slots in that portion of the revoluble slotted disk which crosses it and this distance in turn is determined for a required pitch of the fundamental of the series by dividing the annular concentric ring into a number of equal parts found by dividing a selected frequency in vibrations per second by the selected speed in revolutions per second. For lowest pitched fundamental a number of equal divisions on the slotted disk are chosen such that subsequent fractional portions of this pitch forming the scale will form a whole number when multiplied by it. Taking notes of the major scale C, D, E, and F, these in the just tempered scale have fractional relations of $$\frac{1}{1}, \frac{9}{8}, \frac{6}{5} \text{ and } \frac{5}{4}$$

respectively. If then 24 spaces are chosen for the lowest note of the scale 24 will be found when multiplied by these ratios to provide even numbers. However when playing incidentals or in the minor mode other pitches are required for example C♯ with a fraction relationship $$D\flat \text{ of } \frac{27}{25}, E\flat \frac{6}{5},$$

etc. These cannot be placed upon the same disk where 24 is used as a basic division for 25 and 5 will not divide evenly into 24 and it would be necessary to have a fractional part of a wave on the record which would make it inoperative. A second disk is therefore provided to operate at a speed in connection with a new basic number, for example 25, with which the notes outside of the major mode may be executed. It is to be understood that the second disk and light openings are only used for incidentals outside the major mode and not for semitones within the major scale indicated in ordinary musical compositions by the flats and sharps in the key signature. The latter are provided by the first disk and light openings.

The shutter means 5 and 5', Figs. 4 and 7, are controlled by a series of keys 17 and 18; Fig. 1, each of which may be of the form of a piano keyboard of the usual form having white keys 19 and 20 and black keys 19' and 20'. The white keys operate the shutter means 5 and the black keys operate the shutter means 5', as indicated diagrammatically by arrowed lines in Fig. 1. Said keys also operate electric switches in the circuits to my series resistance in my chord intensity controls (Fig. 8). The keys 19, 19', 20 and 20' may each have means to return it from its depressed position such as a spring 19a as shown in Fig. 8.

Figure 2:
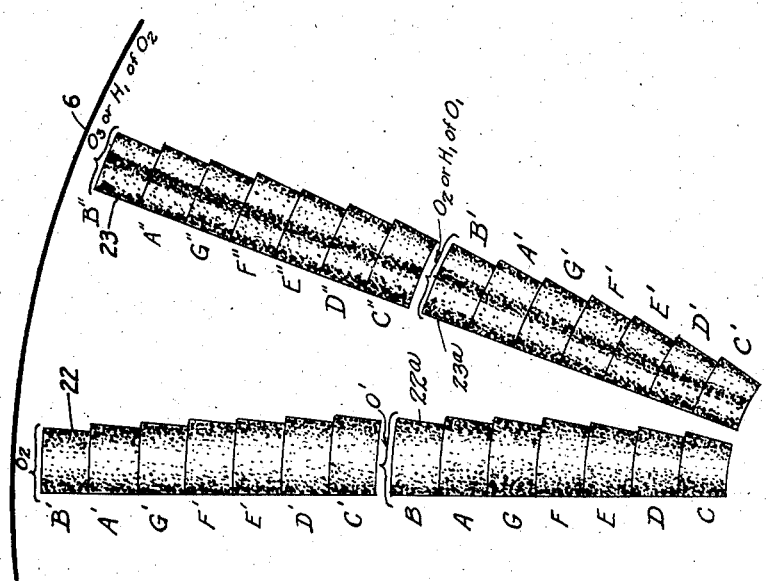

In Figure 2 I have shown a portion of one of my records 6 in which my light transmitting openings 22, 23 are arranged in concentric rings as well as in radial lines. I have arranged each radial line of openings in my records to cover the notes of the scale of two octaves to enable the playing of chords within this range.

Successive radial lines of openings in my record in either the inner or outer series corresponds to a pitch which differs from that of the first line by being in progressive harmonic multiples of the first.

Thus my concentric series of records are so grouped that they include in addition to the initial fundamental note and the harmonics of this note the higher octaves of the initial fundamental and their respective harmonics as well. My arrangement produces a relatively compact record thus avoiding records of excessive size, secondly it utilizes the octaves existing within the harmonic series to prevent duplication and thirdly, it provides for variation in quality by the choice and intensity of harmonics accompanying a fundamental or chord of fundamentals by varying the opening of the shutter means 5 and 5' opposite the selected harmonics.

The pitches of the notes within the major scale are related by simple ratios. To maintain these ratios which are those on my record, and at the same time start at higher or lower registers, that is to say to play in just temperament I use a friction speed change mechanism such as is shown in Figure 1. The successive steps on the driving member are designed for speeds which will produce the proper pitches of the scale.

Only one of my signature stops 21 (Fig. 1) is used at a time, the remaining stops 21 being retained in normally inoperative position by any suitable means, such as a resilient catch, not shown. If my signature stops 21 (Figure 1) are placed in the position of the key signatures of a given composition, the levers 19 or 20 when depressed will vary the pitch throughout the major scale starting with a pitch or the key-note dependent upon the signature key depressed. Incidental notes are played on my black keys 19' or 20'. Due to the odd ratios of the latter, it is necessary to operate my disk 7 at a different speed from that of my disk 7' and on this account I have provided duplicate beam systems (Fig. 1). The required speed differences are obtained by selecting bevel gears of the proper proportions for the gear trains 11 and 12.

My duplicate keyboards 17 and 18 are provided for the purpose of playing chords having notes within a range of two octaves. The white keys of one keyboard operate shutters cooperating with the outer set of patterns 22, 23, etc., of record 6, as shown in Fig. 2, while the white keys of the other keyboard operate other shutters cooperating with the inner set of patterns 22a, 23a. The outer set of patterns in each radial line is an octave higher in pitch than corresponding patterns comprising the inner set. In a similar manner the black keys of the two keyboards cooperate with two similar sets of patterns, an octave apart, on the record 6'.

Chord volume control is provided for through mechanism shown in Fig. 4, in which a revoluble disk 24 which may be revolubly mounted transversely of the light path, as between the cells 2 and 2' and reflectors 10 and 10', having shaded sectors. The disc 24 is selectively operated from the keyboard keys 19 each of which open and close a switch 26a in parallel circuits each including a resistor 25. These circuits energize an armature 24a in a magnetic field produced by the field pieces 24b. The armature is of such character common in the art (such as found in amperemeters and galvanometers) where its movement about its axis is restrained by a tension means 24c such as a spring or the like. By this means the chord intensity of sound may be equalized while playing chords having a different number of notes contained therein. In this form course filament lamps 4 and 4' may be used with alternating current.

A means for varying the lamp intensity for increasing or diminishing the volume of sound may be provided by two three-element vapor filled tubes 27 and circuit arrangement as shown in Fig. 8, which in conjunction with the filter circuit 27a simultaneously will supply filtered unidirectional current from an alternating current supply 27b.

For gradual diminution I provide a grid bias inductance coil 28 having a sliding contact 28a which may be operated by means of a foot pedal 28b, Fig. 1 through any suitable operative connection. This system minimizes lag which may be further eliminated if the lamps 4 and 4' are of the gas-filled type and have fine ribbon filaments.

A second inductance 29 paralleling inductance 28 is provided with a plurality of taps 30 which divide this inductance into portions which give equal auditory volume gradations.

An alternate means is shown in Fig. 8, whereby chords may be equalized in volume regardless of the number of notes composing them. This means comprises, a plurality of series resistances 31, selectively placed in the circuit by the closing of one or more of a plurality of double throw switches 32, each operated by the keys 19, 19', 20, or 20' of the keyboards 17 or 18 (Fig. 1).

In normal position each of these double throw switches closes a low resistance shunt, and whenever a keyboard key is depressed it operates a switch 32 to first break one shunt, then as depressed further, closes a circuit through one of my series resistances 31 and simultaneously closes one of a plurality of single throw switches 32—A in one of a plurality of normally open circuits to both lamps 4 and 4'. These controls may also serve to equalize the intensity of sound at the different pitches in the musical range. There are as many switches 32 and 32a as there are keys 19 and 19', 20 and 20'. While in Fig. 8 only one key 19 is shown, it is understood that the switches 32 and 32a shown as not associated with a key is merely a diagrammatic showing and are to be associated with such keys. Furthermore a circuit is shown representing only two sets of switches whereas in a complete instrument the circiut as shown is extended to include all keys of the keyboard.

The form shown in Figs. 1 to 7 utilizes record patterns 22, 22a, 23, 23a, which may consist of openings representative of the pitches in the scale of one octave and their harmonics, respectively, but which is extended to include a second octave and companion harmonics because of a limitation of the mechanism to execute chords within more than the number of octaves present on a radial set of patterns of the records. In this form utilization is made of the fundamental and their harmonics of higher octaves which are already present in the frequencies of the initial octave and its attendant harmonic frequencies as opposed to forms which shall be described later in which all the pitches on the keyboard in several octaves are represented as separate elements on the record as well as their respective harmonic frequencies which results in duplication of record elements, representative of the same vibration frequency.

The mechanism shown by Fig. 4 of the general form illustrated in Fig. 1 consists of a series of independently operated shutters 33 one for each of the record elements representative of the frequencies of the fundamentals of one octave and their harmonics, respectively, as before mentioned associated with one keyboard 17 and a second octave with its harmonics associated with the second keyboard 18 shown in Fig. 1. These shutters are selectively opened by magnetically controlled mechanisms manually set in operation by the keys of the keyboard such that pattern elements are uncovered representative of the fundamental and companion harmonic frequencies of any particular key of the keyboard which is depressed. The relative degree of opening of these shutters, which in turn determines the relative intensity or volume of a fundamental and its harmonics which may be selected assigns the quality or tone color to the notes sounded. Manually operated control devices such as its foot pedals 54, push-pull handles 56 or revolvable knobs 47a (see Figs. 1 and 2), which in pipe organ terminology may be collectively spoken of as stops serve this latter purpose. They control the intensity of selected fundamentals and harmonics either individually or collectively in varying amounts through attendant mechanism 46 to 60, working in conjunction with a magnetic and mechanical system which is coupled and has parts in common with the aforesaid magnetically controlled mechanism associated with the keys of the keyboard and the shutters. If the same shutter is to serve as one of the fundamental notes or as the harmonics of lower octave notes some automatic control device must be provided for selecting the degree of opening of the various shutters representing the fundamental or harmonics of any key of the keyboard as it is depressed. The solenoids 45 are the aforesaid actuating means for automatic control of the degree of opening. The stops and their attendant mechanics provide the means for selection. The double action solenoids 36 are the activating means for controlling which shutters are to be opened when the fundamental pitch desired is selected from the keys of the keyboard. Parts shown and identified in Fig. 4 as 24 and 25, 26a, do not enter into the above described phase of the operation and its function has been previously described.

There are as many double action solenoids 36 as there are hinged shutter members 33. It has already been stated that the shutter members 33 control an individual record pattern and that the record 6 contains patterns of the fundamentals of an octave and the harmonics of each fundamental for each of the two keyboards. As previously stated, one keyboard starts an octave higher than the other. Therefore, each solenoid is connected by circuits containing selective switches 61 associated with each key of a keyboard corresponding with the fundamental and harmonic frequencies respectively which that key of the keyboard represents. However, for purposes of convenient illustration, the solenoids in Fig. 4 are shown as connected to the selective switches 61 of only one key.

The shutter means 5 and 5' shown particularly in Figs. 1, 4, and 7 comprising an opaque support 5a have a plurality of openings 5b each controlled by a hinged shutter member 33 (Figs. 4 and 7), there being only two shutters shown for convenience, the lower of which is shown partly opened and the upper closed. The openings 5a are arranged in radial lines corresponding to those of my lines of light transmitting openings 22 and 23 of my records 6, each member 33 being operated by a wire 34 and by a spring 35, the latter tending to return said members to open position when released by their wires 34. Each of the wires 34 is connected to a plunger 36 of a twin coil solenoid having oppositely operating coils 37 and 38. Each solenoid plunger 36 is provided with an extension 39 terminating in a cushioned head 40. The solenoids connected with each radial line of shutter members are grouped so that the extensions 39 will pass through openings in one of a plurality of frames 41 having parallel sides and mounted for limited reciprocating motion (Figs. 4, 4a, and 6), the cushioned heads 40 being placed on the inside of said frames.

Said frames 41 are also provided with a plurality of holes on the side opposite to said solenoid plungers, for receiving a plurality of rods 42 each provided with an inner cushioned head 43.

Each rod 42 is pivotally attached to one of a plurality of pivoted levers 43a on the opposite end, to each of which is pivotally attached a plunger extension 44 of a second solenoid 45. The upward movements of each of said extensions 44 is selectively limited by one of a plurality of transverse floating bars 46 which are in turn limited by one of a plurality of manually revoluble cams 41, or by means of one or more of a plurality of flexible rods 48 which are rigidly mounted at one end, like a beam supported at one end, each rod being so proportioned as to give a different curvature of flexure from those adjacent to it. Each of these flexible rods 48 is connected to one of a plurality of foot operated treadles 49, one of which is shown in side view in Figure 4 in which the rod 48 is pivotally connected by a link 50, to a lever 51 provided with a manually adjustable pivot 52 and a coupling link 53 to one of said treadles 49, which is yieldingly pressed by a restoring spring 54. Each pivot 52 is mounted in a crosshead having limited motion in a stationary slotted guide 55 while the pivot 52 may simultaneously be moved within a longitudinal slot within the lever 51.

For the purpose of obtaining a full opening of a selected line of the shutter members 33 I also provide a plurality of levers 57 each pivoted at one end and adapted to serve as a stop for one of the floating bars 46 and connected between its ends by a link 58 to a lever 59 (Figs. 4 and 5) also coupled to the foot treadle 49 through a common shaft 60.

For the purpose of controlling the current to the solenoids 37 and 38 I provide a multiple contact switch 61 by means of which pressure on one of my keys (such as 19) first opens its contacts 38a of a circuit 38b through solenoid 38 and immediately closes the contact 37a of circuit 37b through the solenoid 37, further pressure operates solenoids in other series in a similar manner, thus bringing in the harmonics of the fundamental sound.

I introduce a variable inductance 62 in the circuit to the solenoid 37 for the purpose of retarding its action and also introduce a similar variable inductance 63 in the circuit to the solenoid 38 for retarding the closing of the shutter elements 33. Several other ways of retarding the action of these solenoids may be used, such as by means of separate short circuit windings. A switch 64 is provided in the circuit of the solenoid 37 for selectively cutting out any harmonic not desired.

In each of the independent circuits to my solenoids 45 I place a switch 65 which is also closed by pressure on a corresponding key, such as 19.

In Figure 9 I have shown a means for at will introducing light fluctuations for producing a tremolo sound effect. It consists of a revoluble translucent disk 66 having one portion 67 relatively transparent and another portion 68 relatively opaque with portions shading gradually from one into the other. This disk may be manually moved laterally in or out of the path of light rays by any suitable means, as by handle 68a.

A special form of radiant energy emitter is shown in Figure 11 which may be used to replace lamps 4 and 4' and reflectors 8, 8', 9 and 9' of the form shown in Figure 1. A plurality of such radiant emitters 69 are arranged in radial lines to throw light through aligned light transmitting openings of the records 6. The emitters may have filaments 70 of identical construction. However, only one emitter 69 is shown in Fig. 11, but a plurality of such emitters are arranged in radial lines with respect to the axis of disc 7. Radiations from these emitters first pass through shield 71, having openings 72, in alignment with corresponding light transmitting openings of the record 6. Light passing through the openings of the shield 72 is directed in parallel rays by means of a plurality of radially arranged cylindrical lenses 73, upon my record 6 and disk 7.

Each emitter 69 is connected through a multiple contact switch 74 having flexible members 74a enabling the closing of one or more circuits before the remaining circuits are closed, a plurality of variable resistances 75, a second set of variable resistances 76, arranged in parallel, which are controlled by a flexible beam 77 or other equivalent, such as a multiple rotating arm resistor with varying widths, the circuit of each resistance 76 being controlled by one of a plurality of switches 78 to eliminate at will any harmonics not desired. Another variable resistance 79 is placed in one of two circuits arranged in parallel, in the other of which are place a plurality of switch controlled resistances 80 connected in parallel, both being connected with a common return lead to the lamp filaments. This electrical filament control identified by 75 to 79 serves to accomplish what may be performed by the cam and flexible rod and pedal arrangement of the form shown in Figure 4.

For obtaining equal chord intensity the switch and resistance circuits 31; 32 and 32—A (Figure 8), may be connected in series in the circuit shown in Figure 11 between my battery and my variable resistance 79.

In a modification shown in Figure 12 I use a special form of photo-electric cell 81 which may be used to replace the photo cells 2—2' and reflectors 10—10' of the form shown in Figure 1 and which is provided with a plurality of concave cylindrical cathodes 82 provided with a light sensitive coating on their concave faces each having a companion anode 83 which may be formed of a rod or wire placed at the axis of its companion cathode. The cathodes 82 are connected in parallel by a common lead 84 from a battery 85, while each anode 83 is connected to one of a plurality of terminals 86 of one of a plurality of multiple contact switches 87, having a plurality of electrically insulated conducting tongues 88. One of the photo-electric cells 81 is mounted opposite each line of radial openings in the record 6 with its axis substantially parallel with said radial openings. One of the revoluble disks 7 is placed between the record 6 and the light source and provides a means for sweeping each of the record openings with a radially moving beam of light. The rays which pass through the disk and record fall upon the concave surfaces of the cathodes 82 which emit electrons that are drawn to their companion anodes 83 and thus complete the electric circuit which is substantially normally open when no light is falling on the cathode.

For the purpose of carrying away the cumulative charge on the anodes 83, each is normally grounded through a plurality of switch contacts 89 to a common ground 90 for the purpose of carrying away any small charges which may accumulate thereon when it is not in use.

My switches 87 are also associated with a plurality of contacts 91 by means of which a plurality of circuits may be successively closed by means of one of the keys 19 (Figure 1) not shown in these drawings. Each key of the keyboard controls a multiple switch whose circuits are associated with cell elements which receive light from the record patterns comprising the fundamental and harmonic frequencies sounded by that key, which are included in patterns comprising the fundamentals of the lowest octave on the keyboard and their respective harmonics, as shall be described in detail later, such that one cell element may serve one or more of the switches 87.

One of the last mentioned circuits, associated with each keyboard key, includes a variable resistance 92a by means of which it may be controlled and even opened, if desired for fundamental intensity control. Each of the circuits from the remaining contacts 91 of the switches 87 include a manually operated switch 93 for the purpose of at will cutting out any harmonics of like degree of the fundamental sound. In series with these switches 93 is one of a plurality of other variable resistances 94 each varying the intensity of harmonics of like degree controlled by one of a plurality of manually operated flexible rods 95, each rigidly supported at one end 96, each of said rods may have various curvatures of flexure as previously mentioned whereby the relative intensity of the harmonics may be selectively varied. In series with these variable resistances 94 is one of a plurality of other variable resistors 92h for individual harmonic intensity control. In series with each of the last mentioned resistors 92h is one of a plurality of electromagnetically operated switches 95a which may be opened or closed by one of a plurality of relay circuits 96 which include a manually operated inductance 97 and a switch 98 also operated by the key 19 for introducing a variable harmonic time lag.

From each of the switches 95a the circuits are joined and again divided, one path being provided through a resistance 99 thence to a ground 100 through a grid-biasing battery 101. In another circuit from the switches 95 is a coupling condenser 102, a grid leak 103 to the grid-biasing battery 101 and thence to the ground 100. The grid leak side of the coupling condenser 102 is connected to a grid 104 of a four element thermoionic tube 105 the plate circuit of which contains a loudspeaker 106. Independent means for controlling the sound from the loudspeaker 106 is provided by means for controlling the potential on a second grid 107 of the tube 105.

A means for varying the potential on this second grid 107 consists of a plurality of resistances 108 each of which may be connected singly or in parallel with one or more of its companion resistances by means of one or more of a plurality of chord intensity control switches 109 also operated by keys of my keyboard, together with a variable resistance 110 having a plurality of taps for obtaining equal sound gradations or a second variable resistance 111 which may be optionally operated together with a movable contact of a potentiometer 112 and a battery 113 which furnishes current for operating said potentiometer.

The closing of all of the switches 109 would permit the maximum current to flow through the parallel fixed resistances 108 while the resistance 110 provides a means for obtaining equal gradations of sound and the resistance 111 provides an alternate means for obtaining unequal gradations of sound.

In Figure 10 there is shown a portion of an alternate form of the records 6 which may be used with either of the modifications illustrated in Figures 11 and 12. In this form graduation of light intensity is obtained by varying the outline of my light openings instead of by gradations in the translucency of the openings shown in Fig. 2.

In this modification an opening 114 of sinusoidal outline corresponds to the lowest note and following notes as far as an inner opening 115 in radial succession comprise the remaining notes of the lowest octave. A pair of openings 116 and 117 each of sinusoidal outline corresponds to a note an octave higher than that corresponding to 114 which also represents the first harmonics of the outer opening 114 in the first radial set of openings but their total width at their bases is just equal to that of 114, which is also equal to the distance between adjacent slots in a corresponding annular ring of slots in my revoluble disk 7. The notes of higher pitch than the pair 116 and 117 follow in radial succession toward the center as in the first radial set of openings. In succession other radial lines of openings, each corresponding to harmonics of the fundamentals in the first radial line are provided and these will be formed with openings having 3, 4, 5, 6, 7, 8 up to n crests, which would correspond to the fundamentals of the harmonics in the first radial line. In this modification of my record the radial lines correspond to a single octave instead of two as in Figure 2, because each of the modifications with which it is used is provided with an independent note control, making possible the playing of any chords without the complication involved in the use of my first form of record.

The stationary screen 6 and 6' of Fig. 1 and variously designated in the other modifications containing a number of light transmitting openings, each comprised of one or more shaded portions in sine wave proportions, may be made from a photographic plate by moving it in front of a narrow beam of light either with uniform motion and a varying beam of light either with uniform motion and a varying beam intensity or with a constant beam intensity and a varying rate of motion. By the latter method the time rate of exposure during the making of one of the sine wave shadings of any one composite light opening is effected by the rate of translation produced by the thrust of a cam during one half of a revolution.

In Figure 13 illustrating an apparatus using such a cam for making my shaded records, 118 represents a light which may be an incandescent lamp, 119 a pair of lenses for focusing the light through a color filter 120 upon a shield 121 provided with a narrow vertical slot which produces a vertical line light source. This beam of light then passes through a diaphragm 122 provided with an opening 123 which diaphragm serves to reduce spherical aberration, and is focused by a lens 124 through a second shield 125 provided with an opening 126 serving to confine the light beam to a restricted area on a photographic film 127 on a revoluble disk 128 mounted upon a shaft 129.

The shaft 129 may be moved intermittently through angular distances corresponding to the shading of a single sine wave to be recorded such as my light transmitting openings 22 or 23 (Fig. 2). When my openings correspond to a plurality of sine waves each wave would be recorded in succession.

On Figure 14 there is also shown a mechanism which I have provided for moving my disk 128 and the sensitized film carried thereon which consists of a pinion 130 mounted on the shaft 129 and moved by a rack 131 (which may have a length equal to the circumference of the pinion 130), which is intermittently coupled by an electromagnetic clutch 132 to a bar 133 pivotally attached to a vertical lever 134 provided with a slot 135 for permitting limited longitudinal movement of the pivoted connection with said bar 133. The lever 134 is pivotally mounted upon a support 136 and at the opposite end is provided with a plurality of transverse holes 137 for varying its effective length. A spring 138 engages the upper end of said lever which is coupled by means of a link 139 to a reciprocating cam follower 140 which is driven by a cam 141 mounted on a shaft on which a contact commutator 142 is also revolubly mounted. The commutator 142 is connected by means of wires 143 and 144 with the electromagnetic clutch 132 and in a second circuit 145 and 146 with the lamp 118 (Figs. 13 and 14). Whenever the operative length of my lever is shortened the photographic film is moved through a correspondingly smaller angle. The slow movement of this apparatus and the fact that the light source 118 is cut off by the commutator at the same time that the magnet releases the rack 131 will permit manual operation in switching off a constant speed motor, (not shown) by which the cam 141 and commutator 142 are driven, to stop my mechanism when a record is completed. I provide a suitable speed control means (not shown) for at will increasing the speed of rotation of my cam 141 when the effective length of my lever 134 is increased, and vice versa.

As an alternative I may vary the intensity of the vertical line light source from the slit in the shield 121. Either method will assure the recording of wave forms of uniform degree of varied shading regardless of their width. If the density of a developed photographic emulsion were directly proportional to the light intensity or what amounts to the same thing, the time of exposure, then the photographic plate might be moved in simple harmonic motion to produce the sine wave shading. This might be accomplished in a number of ways but should a cam be used in a manner as illustrated then its outline may be obtained as follows.

Proportional parts of the ordinates of a sine curve taken at equal distances along the X axis may be marked off one after the other along a line passing through the fixed center of the proposed cam outline starting at any convenient distance from the fixed center of the cam outline. After dividing 180° of the proposed cam into a representative number of equal angular divisions the pitch line of the cam will be formed by drawing a smooth curve through the intersections of arcs drawn about the fixed center of the cam from the distances marked off on the above mentioned line passing through the fixed center of the proposed cam outline and corresponding angular radii in order.

Actually the density of the developed photographic plate is not directly proportional to the amount of light. It will therefore be necessary by trial to determine the relative density with varying amounts of light and use the data obtained to correct the length of the ordinates of the sine curve accordingly before obtaining the outline of the cam as above described for a given emulsion to be used. Another method may be used for obtaining shaded composite waves in which the photographic plate is moved at a uniform velocity while the intensity of the light beam is varied. This may be accomplished by providing a transparent form, to be described later, in an opaque screen and revolving a slotted disk, similar to those used in the instrument itself as in Fig. 1, 7 and 7', in front of it. Parallel rays of light of constant intensity passing through the slits and wave opening are converged upon a photo electric cell. The amplified current from this cell is used to operate a glow lamp which will vary with the light incident upon the cell. A narrow beam of light from the glow lamp is allowed to fall upon a photographic plate moved at uniform velocity which when developed will form the required shaded waves. Since the density of a developed photographic emulsion exposed to light is not arithmetically proportional to the amount of light falling upon it, the form of the opening placed in front of the revoluble slotted disk may not be a sine wave. The proper shape to record a sine wave shading on the finished photographic plate may be obtained by first calibrating the system. This may be done by using an opening in the screen in the shape of a triangle. The resulting shaded photographic plate when its varying density is determined may be used to obtain values for altering the shape of a sine wave form so that the actual resulting variations in density will be proportional to a sine curve. To change the number of waves recorded in a given distance the speed ratio between the revoluble slotted disk and that of the moving photographic plate should be changed by suitable change speed mechanism. Variations in speed must be accompanied by proportional regulation of the light intensity reaching the photo electric cell.

A further modification of the musical instrument is illustrated in Figures 15 and 16 which utilizes electrical impulses generated from a modified cathode ray tube 147, in which I have substituted for the ordinary accelerating anode having a central hole, an accelerating anode 148 provided with a narrow slot 149 running substantially the full length of a cathode 150 here shown as a pair of parallel elements which may have an independent heating circuit, not shown, these elements being so placed as to avoid bombardment from positive ions, a single set of deflecting plates 151 parallel with the slot 149 and of substantially the width of a beam passing through said slot, a grounded absorbing screen 152 having a plurality of openings 153 such as are illustrated in Figure 17 and a plurality of receptor plates 154 mounted adjacent to the absorbing screen 152 and of sufficient area to intercept substantially all of the electrons passing through the openings 153. The usual batteries and filament rheostat are indicated, but present no novel features.

In this modification my absorbing screen 152 corresponds to my stationary records 6 and 6' of the modifications shown in Figures 1 and 12 while instead of my light intercepting rotating disks 7 and 7' my deflecting plates 151 serve to successively sweep a cathode ray across the openings 153 and upon my plates 154.

In Figure 16 there is shown a section of my cathode ray tube, taken at ninety degrees from that of Fig. 15, it may be seen that alternate plates 154 are in alignment with successive openings 153 of my absorbing screen 152. The remaining plates 154 shown as located behind solid portions of my absorbing screen 152 receive rays through another line of openings 153. Each of my plates 154 is connected with one of a plurality of double throw switches 155 and through it may be connected either with a ground 156 or with one of a plurality of harmonic regulating circuits which are substantially identical with those shown in Fig. 12 identified by the numerals 91 to 103 inclusive, and for this reason, these numerals are also used to designate identical elements in Fig. 16, but in this modification a battery 157 is placed on the ground side and between the resistance 99 and 103 for the purpose of impressing a positive potential upon the receptor plates 154 above that of the screen 152 which is grounded. From the grid leak 103 the electrical impulses may be amplified by any suitable means, in this case a resistance-capacity coupled amplifier circuit to a loud-speaker 158 in which regulation of the volume of sound may be obtained by means of a potentiometer 159.

The electrostatic field between my deflecting plates 151 is varied to produce oscillations of the cathode ray which fall upon my receptor plates 154.

The deflecting plates 151 constitute a condenser which is connected by wires 160 and 161 to a coupling coil 162 which is in turn inductively coupled to a coil 163, the effective inductance of which may be varied by selectively closing any one of a plurality of switches 164. The coil 163 is connected in series with an inductance coil 165, the effective inductance of which may be varied by closing one of a plurality of switches 166. Connected in parallel with the coils 163 and 165 are a variable condenser 167 and a plurality of fixed condensers 168, each of the latter being selectively connected by one of a plurality of switches 169. These condensers and coils constitute an oscillating circuit and serve to determine the frequency of the fluctuations of the cathode ray of the tube 147.

For supplying power and causing oscillations to be produced there is connected between the coil 163 and the switches 169 an oscillating tube circuit consisting of two direct current blocking condensers 170 and 171, a three element electronic oscillating tube 172, together with a plate battery 173, a choke coil 174, a grid leak 175, a grid biasing battery 176 and a filament heating battery 177. The portion of the coil 165 which is connected in the circuit as well as that portion of the coil 163 between the end switches 164 also serve as a coil in the feed back circuit to the grid, however a feed back coil of constant inductance may be inductively coupled instead. Connected in parallel with the circuit of the coil 162 are a plurality of coupling condensers 179 and 180 each of which may be selectively connected by one of a plurality of switches 181 or 182 respectively.

Each of the switches 166 is controlled by a key of my keyboard, which represents an octave also controlling a switch 181 while each of the switches 169 is connected to one of a different set of keys which also operates a corresponding one of the switches 185. The connections to the coils 163 and 165 are each made to give amounts of inductance which will produce the pitches of the just tempered scale.

A variable condenser 183 is connected in parallel with the condensers 179 for compensating for any variations made by means of the variable condenser 167. Similarly each of a plurality of fixed condensers 184 may be connected in parallel by one of a plurality of switches 185 by a key which simultaneously closes a corresponding switch 169 to a fixed condenser 168 in the oscillating circuit.

In this modification variations of rapidity of oscillation of the cathode ray across any row of openings 153 of my screen 152 varies the pitch, while the variations in the number of openings 153 in a row will also vary the pitch. My cathode tube 147 with the special form of screen 152 need not be changed to produce desired sounds, and it is desirable to maintain the amplitude of oscillation of the cathode ray substantially uniform during the operation of my instrument. This may be done by introducing one or more of the coupling condensers 179, 180 and 184, to compensate for any changes of frequency in the oscillating circuit.

The rapidity of these oscillations may be varied by changing the amount of inductance or the capacity of the oscillating circuit and this may be done by means of my keyboard keys and other manually operated parts. The keys 166 are used to change the pitch within one octave, the keys 169 are used to increase the pitch, each by an octave, condensers 168 being used rather than added inductance to balance the oscillating circuit.

The switches 164 are selectively used to change the key signature key, and need be changed only when changing from one key signature to another, the remaining switches being open.

In order to obtain the equivalent of sine wave proportions with this modification of my invention, I have modified the shapes of the openings 153 as indicated in Fig. 17. This curve was obtained by first plotting a sine wave curve of a height desired for my record; then dividing the distance between adjacent minimum ordinates into equal parts, and measuring the ordinates at these points; secondly plotting a second sine wave curve of a height equal to a desired width of record and dividing the distance between its adjacent maximum and minimum ordinates into a number of equal parts determined by multiplying the arbitrarily chosen number of parts used for said first wave by the number of openings desired in the selected line; next drawing ordinates from these points to the curve; then from the intersections thus determined, drawing lines perpendicular to said ordinates and finally laying off from a line parallel with said ordinates on said last mentioned lines the ordinates measured on said first curve, to obtain points which, when joined, determine the shape of opening or openings desired.

Figure 18 illustrates a further modification of the form of my invention shown in Figs. 15 and 16 in which I have substituted a modified "relaxation circuit" for the "sweep circuit" identified in Fig. 15 by the numerals 160 to 185 inclusive. The wires 160 and 161 from the deflection plates 151 are shown for the purpose of indicating the points of connection of this modified relaxation circuit. An ordinary three element thermionic tube 186 having a filament 187 a grid 188 and a plate 189 and a filament heating battery 190 is connected with the filament 187 and plate 189 in circuit with a condenser 191 and a battery 192. Connected in parallel with the condenser 191 is a vapor filled three element tube 193 at its plate 194 and filament 195. This tube is also provided with a grid battery 196 and a filament heating battery 197. The plate 194 and filament 195 of this tube are also connected to the deflection plates 151 of my cathode ray tube 147. The grid 188 is connected with a plurality of key board operated switches 198 arranged in parallel, a terminal one of these switches being connected in series with a terminal one of a plurality of key signature controlling switches 199, the terminal one of the switches 199 being connected with the filament 187. These switches 198 and 199 are connected at such points of a resistance 200 or 201 as to vary the potential impressed upon the grid 188 to correspond with the pitch of one octave with the switches 198 and resistance 200 or to the pitches of several octaves with the switches 199 and resistance 200.

In parallel with the foregoing circuit is a closed potentiometer circuit having a variable resistance 202 and a battery 203. With this modification I use a cathode ray tube having a modified screen 204 in place of that shown in Figures 15, 16, and 17. The openings in my screen 204 differ from those of my screen 153 in being of true sine wave form, otherwise these screens are substantially identical. In this modification the keys 199 serve to change the key signature, while the switches 198 provide a means for changing the pitch throughout several octaves, by producing changes in the potential impressed upon the grid 188 which in turn limits the rate of flow of current from the battery 192 through the tube 186 from filament to plate.

The condenser 191 is charged at a rate depending upon the rate of flow of current through the tube 186 and simultaneously the field strength between my deflection plates 151 is built up at substantially the same rate. When the ionization potential of the vapor in the vapor filled tube is reached, the condenser is discharged through the nonresistive circuit of said tube. This results in first deflecting the cathode ray between the deflection plates 151 at a uniform rate while the condenser 191 is receiving a charge, and in suddenly returning said ray to its original or "zero" position. Figure 20 is a diagram plotted with voltage on a vertical and time on a horizontal axis showing that the voltage is alternately built up to a predetermined voltage depending upon the width of a series of light transmitting openings and returned to the zero position almost instantly. Figure 21 shows a similar graph in which the amplitude is the same, but the rate of charging the condenser is slower.

The reason for using openings of sine wave proportions in my screen 204 is that with my modification last described, the cathode ray alternately moves in one direction at a uniform rate and then returns to zero substantially instantly whereas in the modification shown in Figs. 15 and 16 the cathode ray oscillates in simple harmonic motion and this makes necessary a suitable modification in the shape of the openings 153 described above.

Referring to the modification illustrated in Figs. 22 and 23, I provide parallel beams of light, indicated by the parallel lines 205 from a source of energy 4 similarly as shown in Fig. 1. These may be furnished by suitable lamps and reflectors, such as are shown in the form illustrated by Fig. 1.

To each key 206 of the keyboard I interlink a shutter 207. One key of the keyboard with its accompanying shutter and interlinking mechanism is shown. The key 206 is formed as a bell crank and when depressed against the tension of a spring 208 turns the key about the pivot 209 thereby pushing a link 210 pivotally attached to an arm 211 which is rigidly connected with a bevel gear 212 in mesh with a companion bevel gear 213 which it turns through a small angle to open or close a shutter 207, which may be a rectangular strip of opaque material placed as shown with its longer side parallel with an endless belt 214 and interposed between a plurality of slits 215, in said movable belt, and the light source. These parallel rows of parallel slits may be replaced by similar transparent portions in an otherwise opaque belt. Underneath the movable slotted belt 214 I provide a stationary flat plate 216 of opaque material in which are a plurality of rectangular light transmitting openings 217.

As the belt 214 is moved at a predetermined speed each of these openings 217 serves to transmit light to produce one vibration frequency and correspond to the openings 22 and 23 of Fig. 2, the intensity of the shading varying in the direction of the movement of the belt.

These openings are aligned in the direction of the travel of the belt as well as at right angles to said first direction. Each series of composite openings which form a row in the direction of belt travel consists first of an opening which is effective in producing one note of keyboard and following at other pitches which are its harmonics. The units making up the shaded composite light openings will then vary in their number for succeeding openings in the relation of 1, 2, 3, 4 etc. or multiples thereof. I align the pattern openings 217 to correspond with the fundamental frequencies or apparent pitch frequencies sounded by the keys of the keyboard in a row at right angles to the direction of travel and likewise in the same direction each set of harmonic degrees of the fundamentals, i. e., the 1st harmonics, 2nd harmonics, 3rd harmonics, etc., as previously described.

The arrangement of the composite light openings 217 on the opaque plate 216 in this modification, which incorporates a movable slotted belt differs from the position of these openings on the stationary screen of the other types of the instrument where I employ a revoluble slotted disk (see Fig. 1) in place of my slotted belt 214. It differs in that each of the series of light openings which consist of fundamental and harmonic pitches form parallel rows in the direction of belt travel in this modification whereas in the other types above mentioned this series is arranged in concentric formation on my records. The above mentioned light openings are also aligned so that they fall into groups consisting of fundamental pitches or harmonics of like degree. These are arranged in rows at right angles to the direction of belt travel in this modification and in radial lines in the types employing the revoluble disk.

The belt type as illustrated also differs somewhat from the disk types, previously described in the frequencies represented by their respective composite light openings. In the belt type there may be, as illustrated, only the harmonics of the lowest frequency or fundamental in each of the rows parallel to the belt travel, whereas in the concentric rows corresponding to the above mentioned rows in the belt type there may be included the harmonics of the frequencies which are octaves as well as, harmonics of the lowest note. It is understood that both systems are applicable in either type.

Each composite opening of a group in the direction of belt travel is of the same width and equal to that between leading edges of the slots 215 above it in the movable belt 214. These widths and corresponding slot 215 spacings will vary with the different notes as previously described in other forms.

It is to be noted that I place the shutters 207 in position such that the movement of each shutter will uncover a portion of the composite openings corresponding to a certain key of the keyboard and along with it all of its harmonics. In as much as the shading varies only in the direction of belt travel and not at right angles to it at any position it is apparent that uncovering a portion of these composite openings at right angles to the belt travel will not not alter the frequencies of any note and its harmonics but only their intensity.

For the purpose of receiving and transmitting the energy passing through the slots 215 and the shaded openings 217, I provide a plurality of light sensitive cells 218 arranged transversely to the direction of movement of the belt 214 and beneath the plate 216.

I place one of these cells under each row of composite light openings at right angles to the belt travel, i. e., one cell receives the light passing through all of the light openings which produce the fundamental pitches while each one of the remainder receives the light passing through a row of light openings to all of the harmonics of one of the harmonic degrees.

By using a separate photo cell for each set of harmonics of like degree their independent intensity regulation is attained. This may be accomplished by varying the amount of light falling upon a second set of photo cells 219 in series with each of the cells 218. I connect all of the cathodes 220 of the cells 218 by a common lead to the negative pole of a battery 221 while each anode is connected separately to the cathode 222 of one of the plurality of photo cells 219. The anodes 223 of the second set of cells 219 are joined by a common lead to an amplifier 224 which is grounded together with the positive terminal of the battery 221 at 225, or through another photo cell 219' placed in series in the common lead from the anodes of the photo cells 219 as an alternative means for regulating the intensity in general. When the intensity control cell 219' is used its anode is connected to the amplifier. This cell is convenient for tremolo modulation.

For this purpose an independent source of light would be required with a suitable shutter interposed between the light and cell.

The source of light which I provide for actuating the control cells 219 may be a gas filled discharge tube 226 which may also serve the purpose, if operated from power derived from a radio frequency oscillator 227, of introducing a carrier wave in the photo cell circuit so that a tuned amplifier 224 may be employed. Interposed between the discharge tube 226 and the control cells 219 I place a stationary screen 228 containing one slot for each cell parallel with the discharge tube. Between the screen 228 and the photo cell 219 I place a revoluble transparent disk 229 over which may be placed a record 230 with concentric tracks 231 of continuous concentric rings of varying opacity. A continuous band may be used in place of the revoluble disk for the same purpose which is to provide constantly varying harmonic control which would be difficult to do manually. For manual operation, shutters, of any suitable type, for each control cell may be used to cut out certain harmonics or change their intensity and flexible rods may be interposed across the light path in place of the slotted screen 228 and disk 229 and 230. The shutters just mentioned may be of the type shown in Fig. 4. It may be seen that tremolo effects for separate harmonics may be produced by simply moving any opaque body across the path of a selected light beam from the light source 226 and one or more of the harmonic control photo cells 219.

In the modification shown in Figs. 24 and 25 the light source may be placed along the axis and may take the form of a vapor and gas filled discharge tube 232 with an oxide coated cathode. A cylindrical reflector 233 polished on the inner surface may be used to intensify the light which will pass out in a radial direction.

A revoluble opaque drum 234 provided with a plurality of rings of narrow slits or light transmitting openings 235 permits narrow bands of light to fall upon a plurality of light openings 236 similar to 217 of Fig. 23 in a semi-cylindrical opaque screen 237 when one or more of the manually operated shutters 238 is open. The light which is permitted to pass the shaded light openings 236 falls upon a plurality of light sensitive cells 239 which may control electrical circuits similar to those illustrated in Fig. 23.

The layout of the slits in the cylinder 234 and the alignment and frequency of the composite light openings 236 in the screen 237 may be considered as identical with that of the belt type illustrated in Figs. 22 and 23 if the belt 214 is considered as being circular and the flat screen 216 containing the light transmitting openings is thought of as bent to the form of the cylindrical drum 234.

The cylindrical drum 234 Figs. 24 and 25 is shown as supported by end pieces 240 joined to a hollow shaft to allow the lamp 232 to be introduced and supported along the axis of the cylinder 234. The outer sheath of the cylindrical drum 234 may be made up of a cylinder 241 of a light and strong material and a developed photographic film 242 fastened around it. The photographic film has on its opaque surface transparent lines which may be made by reducing photographically a large sheet of white paper on which lines have been drawn in black ink. In order that the light may pass through the transparent lines in the film, wide slots 243 are cut in the cylinder 234 under each such line.

The shutters 238, which are used to uncover the light openings of any pitch of the keyboard along with its family of harmonics, each consists of the shutter proper made up of a cylindrical band of a width equal to that of the slits which is also that of the shaded light openings. It is fixedly mounted upon a saddle unit 244, which is provided with means for moving this cylindrical band along its axis for a distance sufficient to uncover the light opening. This may be done by mounting the saddle unit upon the transverse rods 245 upon which the saddle units are free to move. A pin 246 is engaged by the forked end of an arm 247 connected to a keyboard key 206 by a train of gearing and linkage identical with that shown and described in Fig. 22.

The fourth shutter from the left in Fig. 24 is shown as it would appear with the key depressed a portion of the composite light opening being uncovered to the light. Inasmuch as the shading of the light openings is in the direction of rotation of the slotted drum the shutter opening will only vary the intensity and will not affect the frequency of the notes or their harmonics.

The photoelectric cells 239 are shown as extending the length of the drum, but may be replaced by a plurality of standard photoelectric cells and a plurality of mirrors for focusing the light upon these cells. Each cell receives the light from harmonics of the same degree except one which receives the pitches of the keyboard of one or more octaves.

It is to be remarked that with this and other modifications employing similar shutters the manner in which the notes are sustained may be controlled by the combination of the springs 208, whose tension may be adjusted at the pleasure of the operator, and some variable damping device such as a dash pot, not shown.

Fig. 26, which is a portion of an end view and Fig. 27 a portion of a side view of a modification similar to that of Figs. 24 and 25 except that the only one light sensitive element 248 is used and that is placed along the axis of the revoluble slotted cylinder in the same position as the light source 232 Fig. 25. The independent control of the harmonics is effected in this case by a plurality of shutters 249. For each series of harmonics of the same degree and also the fundamental pitches there is a number of these shutters with their axis at right angles to the axis of the cylinder and operated in each case by a rack 250 and each rack will then control a set of harmonics. A plurality of light sources is now required. In order for the light to pass through the slits of the cylinder to the sensitive cell 248 these rays must pass in a radial direction. This may be accomplished by the aid of a number of longitudinal light sources parallel with the axis of the cylinder. The end of the light source and center of the cylinder are made to form the foci of a cylindrical reflector of elliptical cross-section around each light source.

The construction and use of the shutters 238 are the same as those of Figs. 24 and 25.

In a modification (Fig. 26a) of the revoluble slotted cylinder type Figs. 24 and 25, I continue to use the light source 232 extending along the axis of the cylinder but replace the light sensitive cells 239 by a plurality of shutters similar to those which I have employed in the modifications illustrated in Figs. 26 and 27 and designated per se as 238 and 249. I place a plurality of reflecting surfaces 252, which may be plane mirrors, in the path of the light emanating from each composite light transmitting opening 236 in the record or screen 237 after passing their corresponding shutters 238 and 249' (see Fig. 26a). I tilt each of these mirrors 252 at such an angle that the reflected light from all of the mirrors falls within an area occupied by a light sensitive cell 253 which I place outside of the revoluble slotted cylinder 241 and about an imaginary extended axis of the cylinder and with the light sensitive material facing the cylinder.

As an alternative modification, the plurality of reflecting surfaces may be tilted at 45 degrees so that most of the light rays reflected therefrom will be parallel with the axis of the cylinder. To accomplish this a second set of reflecting surfaces would be used to direct these rays to a light sensitive cell placed outside of the revoluble slotted cylinder and in alignment with the axis thereof with the light sensitive material of said cells facing said second set of reflecting surfaces. In this modification it is necessary to have the light transmitting openings close to the revoluble slotted cylinder. By the use of two concentric slitted cylinders, only radial rays will be emitted and my record may be placed further away.

I may arrange a second self modulating light sensitive cell in series with the first which may serve four purposes:

First: Its self modulating feature which in connection with a radio frequency oscillator generates a carrier wave in the electrical impulses from the first cell thereby permitting tuned frequency amplification. The oscillator may be of variable frequency if desired when using a radio as an amplifier to bring in programs from any desired broadcasting stations while playing the instrument.

Second: In connection with a source of light whose intensity may be diminished proportionately with the increased number of notes in a chord. This may consist of a glow lamp or fine filament enclosed in a bulb containing hydrogen gas. If a glow lamp is used it may be operated from the carrier wave oscillator current and the second light sensitive cell may be replaced by an ordinary cell which is not of self modulating type.

Third: A tremolo wheel as described in Fig. 9 may be interposed between the uniform chord intensity lamp and the second cell.

Fourth: A general intensity control shutter may be interposed between the uniform chord intensity lamp and the second cell to supplement the keyboard control.

The form of instrument Fig. 28 differs from other forms principally in that the slots 256a are stationary while the composite light openings 251 move past these stationary slots 256a.

Parallel beams of light 205, from the source 4, fall upon a plate 252 containing rectangular shutter openings 253 a plurality of shutters 207 are operated through the same type of linkage as previously described, see Figs. 22 and 25, by a key 206 of the key board. As before there may be one shutter for each key of the keyboard.

The light passing through these shutter openings 253 continues through a number of slots 256a in a stationary plate 256. The distance between these slots is immaterial. The slots 256a which one shutter uncovers controls one fundamental note and its family of harmonics each slot 256a corresponding to one of the above frequencies. Below the plate 256 are shown a part of two plates 254 and 255 of transparent material, one below the other, containing shaded light transmitting openings 251. A number of pairs of such plates 254 and 255 exist in the instrument, there being as many pairs as notes in the scale. On each plate 254 and 255, which are identical, are parallel groups of light openings 251 arranged in aligned rows at right angles to each other. As shown in Fig. 28 one of the fundamental pitch patterns of a scale and its harmonics are arranged in row X and parallel to it other octaves of the same note with their harmonics. Thus, in the row F are arranged the fundamental of one pitch of a scale and its octaves. These form parallel rows in the other direction, one row F containing a pitch of the scale, the same as before mentioned, with its octaves, while the remaining rows H1, H2, H3, etc. each contain harmonics of like degree of the before mentioned pitch of a scale and its octaves of row F. The plates 254 and 255 are provided with a reciprocating motion past the slots in the opaque plate 256 such that either a portion of the one or the other light opening of plates 254 or 255 are always passing the slits and in such a manner that there is no rest period.

The reciprocating motion is provided by coupling the several plates, one pair of which are illustrated and designated as 254 and 255, with an operating mechanism, not shown, by means of pins 257 working in slotted yokes 258. The diameter of the crank pin throw is made equal to the diagonal of a square the sides of which are equal to the length in the direction of varying shading of the composite light transmitting openings, which are all of equal size.

When assembling my device each pair of plates is placed so that their identical composite light transmitting openings coincide, the pair are then moved relative to the slots in the plate 256 such that the edges of the light openings on one side are in vertical alignment with a corresponding slit, they are then coupled to the pins 257 in the yokes 258 with the pins 90° out of phase and with their position in vertical alignment. This is such that when both cranks are rotated one opening is just starting to clear the slot as the other is starting across it.

As illustrated, the separate yokes and cranks coupled to each of the pair of plates 254 and 255 are operated by separate shafts. These however may have a common shaft since the pins 257 are rotated at the same speed for each pair of plates.

Each such pair is run at a different speed, proportional to that corresponding with one pitch of the scale. Each such pair of shaded openings used for different pitches are identical.

Since the shaded openings composing a pair are also identical it follows from the above that all are alike.

The speed change for the different sets of plates 254 and 255 may be accomplished by gearing and this in turn will be connected to a speed change stepped friction drive or similar device such as that shown in Fig. 1 for varying the key signature.

The nature of the waves themselves as shaded in the composite light openings of the plates 254 and 255 are much the same as employed in Figs. 22 and 23 since the relative velocity is almost linear, inasmuch as utilization is made of only the substantially uniform portions of two cooperating harmonic motions. However, the difference may be taken care of in making the shaded openings by employing the same reciprocating motion in making the shaded openings.

After the light passes the shaded openings it is again limited by a second set of shutters 259 which open in the same direction as the pitch shutters in plate 252, that is, in the direction of constant shading of the light openings. These shutters are operated in groups in a line with the harmonics of the same degree, which is in a line parallel with the slits and at right angles to the direction of the motion of 254 and 255, there being a group for each harmonic degree. These shutters are operated by the racks 260, one for each harmonic, which opens all of shutters under all plates of a given harmonic degree. A third set of shutters 261 similar to shutters 207 but at right angles to them are used to cut out selected harmonics altogether by manual control of handles 261a. The racks may be controlled either by flexible rods as 262 or cams 263 through the medium of floating bars 260a of construction similar to those shown by 46 of Figs. 4 and 4a.

As illustrated in Fig. 1 the modifications of my instrument which include movable slotted members, require a dual system when the composite light openings corresponding to the lowest notes have one or but a few waves on each. Thus in the form shown by Fig. 1 the slotted disks 7 and 7' and their companion light opening screens 6 and 6' serve the purpose of producing the chords of the major and minor modes respectively. As previously described the disks 7 and 7' are always moved at a different speed and at a speed ratio fixed by the gear trains 15 and 16 which are not varied.

It may be desirable though not essential that the notes of the scale comprising the lowest octave have one or but a few waves on each of its composite light openings for by so doing the slots in the movable members may be made quite wide as will be determined by the width of one of the waves of the highest frequency composite light opening.

Two forms of my record energy transmitting openings have been illustrated, one has a unidirectional variable energy absorption or is of the variable density type while the other is of the variable area type. The variable density type is particularly adapted to the forms where shutters are used. These record elements are composite and consist of a finite number of periodically recurring density or area waves and have a definite beginning and ending or briefly defined they are discontinuous in form.

The dual systems may be dispensed with and all of the notes of both the major and minor mode placed on one light opening screen if the number of waves on the composite light openings of the lowest octave are increased in number to an extent to be explained presently and the speed of the revoluble slotted member decreased proportionately.

The frequency of the pitch produced by a composite light opening in conjunction with its movable member is equal to $F=NSW$.

Where $F$ = Frequency in cycles sec.
$W$ = Number of waves in the composite light opening.
$S$ = Number of slots in movable member.
$N$ = Number of times movable member passes a point on the screen (revolutions per second in case of disk).

Since the speed of the movable member will be the same for all the series of slots on it the frequency of a number of pitches placed upon the screen will be determined solely by S and W.

Now the notes of the scale in just temperament are related by certain fixed ratios based upon the major and minor chords which have the proportions 4:5:6 and 10:12:15 respectively.

If the absolute frequency of the note C, for example, of one octave is $f$ then D of the same octave will equal $\frac{9}{8}f$; E, will equal $\frac{5}{4}f$; F, $\frac{4}{3}f$; G, $\frac{3}{2}f$; A, $\frac{5}{3}f$; B, $\frac{15}{8}f$; C', $2f$.

We have said that $F=NSW$
Then $Fc=f=NScWc$
and $$Fd=\frac{9}{8}f=\frac{9}{8}\cdot N(ScWc)$$

We have said that $F=NSW$
Then $Fc=f=NScWc$ $Fc=N24$ while $Fd$ will equal $\frac{9}{8}\cdot N24=27n$ Other values are obtained for the remaining notes of the scale in a similar manner.

In this case we might have 1 wave and 24 slits for C or 2 waves and 12 slits, in fact, any combination of the factors. For C, 1 wave and 27 slits or 3 waves and 9 slits.

If we desire to add minor notes for example E♭ (E flat), which has a fractional proportion of $$\frac{6}{5}f$$

then it will be necessary to choose a value for (ScWc) divisible by the denominator 5 as well as the denominators of the major scale fractional proportions which are 8, 4, 3 and 2. The least common divisor is 120. In this case the C note may have 5 waves and 24 slits and SW for E♭ equals $$\frac{6}{5} \times 120 = 144,$$

or one might use 6 waves with 24 slits. The speed would need be $$\frac{1}{5}$$

that required when SW for C equaled 24.

The instrument as designed and described is for use with the just tempered scale. The equally tempered scale may be adopted if desirable.

It is to be noted that with the key signature change system with the just tempered keyboard a given key of the keyboard will have different pitches with different key signature settings, for example, one key of each octave will always be the key note whatever that note may be. The music must be written accordingly, and should make reading easier for it will not be necessary to remember which notes would ordinarily be augmented or diminished according to the key signature of the composition. If desirable the standard method is possible by multiple switches operated at the same time key signature speed changes are effected.

Fig. 1 shows a key signature speed change mechanism (8 to 11) with a plurality of stops 14. Since the key signature of a composition is not changed very frequently this mechanism may be replaced by one having two speed change adjustors operated by a common prime mover and each coupled to the movable slotted member by separate clutches operated by a common lever in such a manner that only one clutch is in contact at a time.

My invention may be adapted as a harmonic synthesizer by substituting for the loud speaker any instrument which will give a visual outline of the complex wave such as a cathode ray oscillograph incorporating a sweep circuit which provides a stationary pattern on the fluorescent screen.

It may also be adapted for color matching and display use such as an illuminated fountain by replacing the shaded light transmitting openings by colored glasses and the photoelectric cell of form 1 by an optical system to throw a colored beam. Dominant colors could be retained in a similar manner as are fundamental sounds.

It may be adapted for automatic musical reproduction as in a player piano and if desired the control of quality may be left under manual control.

For other than musical purposes as a generator of complex sounds it offers a tool for acoustical study. In this connection phase relationship of harmonics may be adjusted at will in the case of the cathode ray form by adding inductance in the separate circuits and in the revoluble disk type by separating the radial portions of the record to allow them to be shifted about the axis relative to each other.

The foregoing description comprehends only a general and preferred embodiment of my invention and changes in my method and details of my apparatus may be made within the scope of those claims which may be allowed, and therefore these claims are not intended as restricted to the specific details of my invention as disclosed herein.

What I claim is:

1. In an apparatus for the production of complex electrical fluctuations, means for generating electrical impulses corresponding to fundamental frequencies and their harmonics, means for selectively controlling the intensity of any fundamental fluctuations and harmonic frequencies of like degree of any fundamental either independently or collectively in varying amounts and independent means for switching on and off the frequencies of electric fluctuations of any fundamental and their respective harmonics, and a suitable responsive instrument receiving the output of said generating means.

2. In an apparatus for the production of sound, means for generating electrical fluctuations corresponding to fundamental frequencies and their harmonics, means for independently controlling the intensity of any fundamental frequencies and harmonic frequencies of like degree of any fundamental and means for collectively controlling the intensity of at least a selected group of harmonic frequencies of like degree in varying amounts and independent means for switching on and off the frequencies of electric fluctuations of any fundamental and their respective harmonics, means for converting said electric fluctuations into sound waves, and means for controlling the volume of the resulting composite complex sound wave, and a suitable responsive instrument receiving the output of said generating means.

3. In an apparatus for the production of sound of fundamental and harmonic frequencies, a source of light, light sensitive means positioned to be excited by said light source, a plurality of light transmitting means of discontinuous form interposed between said light source and said light sensitive means and each being of varying opacity corresponding to the sinusoidal law, means cooperating with said light transmitting means for varying periodically the light emanating therefrom in a sinusoidal manner, and means for selectively controlling the light of any harmonic or fundamental from said light transmitting means to reaching the light sensitive means.

4. In an apparatus for the production of sound a source of light, a plurality of light transmitting patterns corresponding to the fundamentals of sound and their harmonics and exposed to the light from said source, light sensitive means for producing electrical impulses from the light passing through said patterns, means interrupting and varying periodically the amount of said light passing from said source to said light sensitive means, means for controlling the intensity of harmonic frequencies of like degree of any fundamental, independent means for switching on and off the frequencies of sound impulses of any fundamental and their respective harmonics, and means for converting said resulting electrical impulses into sound.

5. In an apparatus for the production of sound a source of light, a plurality of light transmitting patterns of discontinuous form corresponding to the fundamentals of sound and their harmonics and exposed to the light from said source, light sensitive means for producing electrical impulses from the light passing through said patterns, means interrupting and varying periodically the amount of said light passing from said source to said light sensitive means, means for controlling the intensity of harmonic frequencies of like degree of any fundamental, independent means for switching on and off the frequencies of sound impulses of any fundamental and their respective harmonics, and means for converting said resulting electrical impulses into sound.

6. In an apparatus for the production of sound a source of light, a plurality of light transmitting patterns corresponding to the fundamentals of sound and their harmonics and exposed to the light from said source, light sensitive means for producing electrical impulses from the light passing through said pattern, means interrupting and varying periodically the amount of said light passing from said source to said light sensitive means, means for controlling at will the amount of light to said light sensitive means from the harmonic patterns of like degree, means for independently controlling at will the light passing to the light sensitive means from any fundamental and its respective harmonics, and means for converting said resulting impulses into sound.

7. In an apparatus for producing electrical impulses, a source of energy of controlled intensity, a record including discontinuous patterns, one for each sound fundamental and one for each selected harmonic thereof, means for causing periodical fluctuations in the energy emanating from said patterns, means for selectively varying the total amount of energy emanating from said patterns, means for combining the output from said patterns, and a device responsive to said combined energy connected to said combining means.

8. In an apparatus for producing electrical impulses, a source of light, a plurality of stationary light transmitting patterns corresponding to different sound waves, means for fluctuating periodically the light emanating from said patterns, a plurality of light sensitive means, one for collecting the light passing through each of said patterns respectively, and amplifier means, means for regulating the intensity of electrical energy from each of said sensitive means to the amplifier, and a speaker connected to the amplifier, whereby the sound emitted by the speaker may be varied in pitch or any tone quality.

9. In an apparatus for producing sound, a record for sound producing devices, comprising a body member having patterns of fundamentals and their harmonics thereon, each fundamental having its harmonics arranged in a row therewith in one direction, all of said fundamental patterns being arranged in a row extending in another direction and the harmonics of like degree of all fundamentals being in a row.

10. In an apparatus for producing sound, a record comprising separate patterns of fundamentals and separate patterns of their harmonics respectively, a plurality of operable shutters for opening and closing the patterns of said fundamentals and their harmonics, means for limiting the opening of the patterns of the harmonics of like degree.

11. In an apparatus for producing sound, a record for sound producing devices, comprising a body member having patterns of fundamentals and their harmonics thereon, each fundamental having its harmonics arranged in a row therewith in one direction, all of said fundamental patterns being arranged in a row extending in another direction and the harmonics of like degree of all fundamentals being in a row, a plurality of operable shutters, one for the pattern of each fundamental and its harmonics, a plurality of other shutters, one for the harmonics of like degree of all fundamentals and one for fundamentals, and means for operating said shutters independently of each other.

12. The combination with a record provided with a plurality of light transmitting openings of discontinuous form based on a sine wave curve, of a source of light adapted to supply substantially parallel light rays, a revoluble slotted disk associated with the record to cause fluctuations of light emitted from the record, means for at will varying the speed of said slotted disk, means for causing fluctuations in an electric current corresponding to said light fluctuations, means for converting the electric fluctuations into audible sound waves, and means for selectively varying the intensity of light passing through selected openings of said record to vary the volume of one or more selected harmonics of a sound wave.

13. In a device of the class described, the combination with means for repeatedly and simultaneously producing relative motion between each of a plurality of energy transmitting apertures of predetermined forms and an energized ray, means for intercepting the energy transmitted through each of said apertures, a plurality of means for converting said intercepted energy into electrical impulses, means for varying the current output from each of said converting means, means for simultaneously varying the current output from said plurality of said converting means in equal proportions, and a harmonic synthesizer for operating a suitable electrical instrument by energy received from said current varying means.

14. In a device of the class described, the combination of a source of light, an opaque member provided with a plurality of light transmitting openings, a means provided with a plurality of discontinuous light transmitting openings based substantially on a sine wave curve to form a record and movable with respect to said first member, means for varying the relative motion of said members, a light sensitive means for receiving light fluctuations passing through said light transmitting openings, means for causing fluctuations in an electric current corresponding to light fluctuations received by said light sensitive means, means for converting the electric fluctuations into audible sound waves, and means for selectively varying the intensity of light passing through selected openings of said record to vary the volume of one or more selected harmonics of a sound wave.

15. In a device of the class described in claim 14, further characterized by means for selectively varying the intensity of the light passing through selected openings of said record means to vary the pitch of the sound wave.

16. An instrument comprising a source of light, photo-electric cell means, screen means between said source and said cell means having groups of light transmitting portions of discontinuous form thereon, each group corresponding to a fundamental tone and the harmonics thereof, means for producing relative movement with respect to said screen means of the light beams emanating from said screen means, such that said light beams will produce a fluctuating current in said photo-electric cell means corresponding to notes of fundamental pitch and harmonics thereof, means for translating said current into sound, a keyboard and stops, means operative from the keyboard for selecting the fundamentals and their harmonics of the sound desired, means operative by stops for selecting the fundamentals and harmonics of like degree as desired, and means for varying the proportional intensity of the selected fundamentals and their harmonics, whereby a limitless variation in tone quality may be effected at will.

17. An instrument as set forth in claim 16, further characterized by said screen means having their fundamental and harmonic light transmitting portions aforesaid in the pitch relation of the equally tempered scale, and means for regulating the speed to produce the equally tempered pitch scale in the desired pitch range.

18. An instrument as set forth in claim 16 further characterized by means for varying the speed of the relative movement of said screen means and said light beams selectively in proportion to the frequency of the pitches in the just tempered scale such that each speed change will produce sound, the pitch of which is characteristic of the just tempered scale relation of one of the representative key signatures when said screen means has its fundamental and harmonic light transmitting portions in the pitch relation of the just tempered scale.

19. An instrument as set forth in claim 16, further characterized by a circuit operably connected for controlling the intensity of the output from said photo-electric cell means and including a power and light source connected in series with a plurality of single throw-switches in parallel, a plurality of resistive and non-resistive conductors, each alternatively connected by double-throw switches such that selected resistive or non-resistive conductors may be connected in series with said circuit, means operable by the keys of the keyboard for operating each double throw switch and a companion single throw switch, means for causing the double throw switch to make contact with a resistive conductor before said single throw switch when a key is depressed, and means for causing each double throw switch to contact with a non-resistive conductor shortly after a companion single throw switch is opened, as a key of the said keyboard is released, whereby the intensity of chords may be equalized.

20. An instrument as set forth in claim 16 further characterized by means for causing the output from the photo-electric cell means to pulsate at a substantially regular rate to produce a tremolo effect from translating means.

21. In combination a source of light, a stationary record having a plurality of discontinuous light transmitting record portions and revoluble slotted disk and a plurality of shutters all interposed in said light path, photo-electric cell means for receiving the light emitted from said record, disk and shutters, an amplifier for the electrical currents passing through said photo-electric cell means and a loud speaker connected thereto, a keyboard for playing the instrument, said shutters being arranged one for each of the discontinuous light transmitting portions on said record and normally closing the same, means for operating said shutters to selectively open and close said discontinuous light transmitting portions in said record, said selective operating means including a plurality of double-action solenoids for each key of the keyboard representing a fundamental and its harmonics and having operative connection with said shutters respectively, for opening and closing the same, and multiple switch means associated with each key of the said keyboard for selectively operating the said double action solenoid systems, a plurality of restraining means one for selectively regulating the degree of opening of each group of said shutters which control fundamentals and one for selectively regulating the degree of opening of each group of said shutters which control the harmonics of like degree on said record, a second group of switches one for and operated by each octave set of keys of the said keyboard, a plurality of solenoids for and operated by each octave set of key switches and operatively connected to certain of said restraining means for actuating the latter, manually operated stop means for independently or collectively limiting the motion of said octave solenoids for varying the intensity of the harmonics of the sound thereby establishing the quality or timber of the tone produced by the said loudspeaker.

22. In a device of the character described, the combination of a source of light, means for producing electrical impulses corresponding to fluctuations of light, means for directing the light from said source to said electrical impulse-producing means, a member provided with light transmitting openings, a second member associated with said first member provided with a plurality of discontinuous light transmitting openings of varying opacity corresponding to the fundamentals and separate such openings corresponding to the harmonics of said fundamentals and interposed between said light source and said electric impulse producing means, means for producing relative motion between said first and second members such that the beam of light passing through said openings may be caused to fluctuate, means for converting the electrical impulses into audible sound waves, a plurality of keys constituting a keyboard, shutter means operable from said keys for limiting the effective area of said light transmitting openings, each of said keys actuating shutter means associated, respectively, with the discontinuous light transmitting openings comprising a fundamental and its harmonics, other shutter means for limiting the effective area of said discontinuous light openings; and stop or key means, one for independently operating all of said last-mentioned shutter means controlling the fundamental frequencies, and one for actuating all of the shutter means controlling the harmonic frequencies of like degree, respectively.

23. In a device as set forth in claim 22 further characterized by means associated with the keys of the said keyboard for controlling the rate of motion of these keys and therewith the said first mentioned shutters attached thereto which are associated respectively, whereby, in conjunction with the operation of said other shutter means, desired harmonics and/or fundamentals may swell or diminish in volume before others causing a transitory quality variation.

24. In a device of the character described as set forth in claim 22 further characterized by means for selectively eliminating from said converting means any desired fundamental and/or harmonics of like degree.

25. In a device of the character described in claim 22 further characterized by means for operating the last-mentioned shutters collectively in varying amounts.

26. In a device of the character described, the combination of a source of light, a photo-electric device, a loud speaker operable by said photo-electric device, means for directing the light from said source to said photo-electric device, means for producing periodic fluctuations of varying intensity in the light from said source to produce sound at the loud speaker of definite pitch and quality, said means for causing said light fluctuations comprising a member containing a plurality of narrow elongated light-transmitting openings, a second member having its surface through which the light from said source passes in spaced opposition with said first member and having thereon a plurality of discontinuous patterns arranged substantially in opposite parallel rows, certain patterns each representing a fundamental pitch and certain other patterns each representing separate harmonics respectively, and being of varying opacity in one direction and of uniform opacity in the opposite direction, said first and second members being interposed in the light beam between said source and said photo-electric device, means for producing relative motion between said first and second members in a direction at substantially right angles to the length of said narrow light transmitting openings of said first member and in the direction of the varying opacity of said light transmitting openings of said second member, whereby the desired fluctuations of light may be obtained, a set of shutter means associated with said discontinuous patterns and movable to uncover said patterns in the direction of their uniform opacity, a keyboard having a plurality of keys one of which is operably connected with the shutter means controlling the light passing through one row of patterns comprising a fundamental and its harmonics, a second set of shutter means movable with respect to said patterns to open and close the same in the direction of their uniform opacity, a plurality of independently-operable means, one of which respectively is operatively connected to said second set of shutter means arranged to control a row of patterns extending at substantially right angles to the rows of patterns cooperating with said first set of shutters.

27. In a device as set forth in claim 26 further characterized by means for collectively operating all of said second set of shutters to open or close said patterns in varying degrees.

28. In a device as set forth in claim 26, further characterized by means for eliminating from the selected pitch ranges sets of fundamental patterns and/or their harmonic patterns of like degree.

29. In a device as set forth in claim 26 further characterized by means for automatically equalizing the volume while producing chords which differ in the number of notes.

30. In a device as set forth in claim 26 characterized by means for producing a tremulous effect.

31. In a device of the character described in claim 22 further characterized by said first member being opaque and of continuous form with elongated light transmitting openings therein spaced about its periphery, and the said second member being stationary and positioned about the periphery of said first member, the said light source and the electrical impulse-producing means being positioned so that the light may pass through said light transmitting openings in each of said members at all points at substantially right angles to their surfaces, and said first member being revolvable relative to said stationary member.

32. In a device of the character described, the combination of a revolvable opaque drum provided with a plurality of elongated axially-extending light transmitting openings arranged about the periphery of the drum, a concentrically stationary opaque member positioned adjacent to a peripheral surface of the drum and having a plurality of light transmitting patterns therein discontinuous in form and of varying opacity in the circumferential direction of the drum and with uniform opacity in the direction of the axis of the drum, a source of light means for directing a beam of light from said light source through said light transmitting openings and patterns in said members, sensitive means for producing electrical impulses positioned to be excited by the light transmitted through said openings from said light source, a loud speaker electrically connected with said light sensitive means, a plurality of shutters concentric with said drum and movable in a direction axially of said drum, and each positioned to control the light passing through one circumferential row of openings therein respectively, a second set of shutters mounted concentrically with the drum and movable axially thereof to open and close the patterns in said stationary member in the direction of the axis of the drum.

33. A device as set forth in claim 32 further characterized by means for independently and collectively operating said second set of shutters.

34. In an apparatus for the production of complex sound, means for generating electrical fluctuations corresponding to fundamental frequencies and their harmonics respectively, means for translating said fluctuations into sound, a keyboard and stops for the apparatus, means operative from the keyboard for playing from selected fundamentals and their harmonics the pitches desired, means operative from certain of said stops for controlling the amplitude of the fluctuations from fundamentals and the harmonics of like degree independently from zero to maximum, and means operative from other of the stops for selectively controlling the amplitude of the fluctuations from the fundamentals and the harmonics of like degree collectively from zero to maximum in varying amounts.

35. In an apparatus for the production of complex sound, a record having thereon patterns of fundamental sounds and their harmonics, the patterns of each fundamental and each harmonic being in discontinuous form, means for generating electrical fluctuations from said patterns, a keyboard for playing the apparatus, two sets of shutters, one set controlled by the keys of the keyboard, each shutter arranged to render operative one fundamental and its harmonics, operable stops for the apparatus, operative means connecting the stops to the other set of shutters, said last mentioned shutters being arranged for controlling electrical fluctuations from the patterns, one shutter to control the fundamentals and one to control each group of harmonics of like degree respectively, and means for translating said electrical fluctuations into sound.

36. In an apparatus for the production of complex sound, a record having thereon patterns of fundamental sounds and their harmonics, the patterns of each fundamental and each harmonic being in discontinuous form, means for generating electrical fluctuations from said patterns, a keyboard for playing the apparatus, two sets of shutters, one set controlled by the keys of the keyboard, each shutter arranged to render operative one fundamental and its harmonics, stops operable independent of each other, operative means connecting each of said stops independently to one of the other set of shutters respectively, said last mentioned shutters being arranged for controlling electrical fluctuations from the patterns, one shutter to control the fundamentals and one to control each group of harmonics of like degree respectively, and other stop means for collectively regulating the relative opening and closing of the last mentioned shutters independently of the first mentioned stops for controlling further the electrical fluctuations from said patterns, and means for translating said electrical fluctuations into sound.

37. In an apparatus for the production of complex sound as set forth in claim 36, further characterized by said other stop means being such as to collectively regulate its shutters in varying amounts relative to each other.

38. In an apparatus for the production of complex sound, a record having thereon patterns of fundamental sounds and their harmonics, the patterns of each fundamental and each harmonic being in discontinuous form, means for generating electrical fluctuations from said patterns, a keyboard for playing the apparatus, operable stops, means actuated by the stops and arranged for controlling the electrical fluctuations from the patterns of all fundamentals and of all harmonics of like degree in their respective groups and means actuated by the keys of the keyboard for rendering selectively operable one or more of said fundamentals and its respective harmonics, and means for translating said electrical fluctuations into sound.

39. An apparatus for the production of periodically recurring energy waves comprising energy source means, energy receptive means, means for transmitting energy from said source to said energy receptive means, means interposed between said source of energy and said receptive means for projecting the energy originating at said source means, in the form of beams, upon said receptive means, discontinuous, unidirectionally and periodically varying energy absorptive means, means for causing relative motion between said beams of energy and said discontinuous, varying energy absorptive means, whereby, periodic variations of the energy content in said projected energy beams representative, respectively, of pure tones comprising fundamental frequencies and their overtones may be effected.

40. An apparatus for the production of sound comprising energy source means, energy receptive means, means for transmitting energy from said source to said energy receptive means, means interposed between said source of energy and said receptive means for projecting the energy originating at said source means, in the form of beams, upon said receptive means, discontinuous, periodically and unidirectionally varying energy absorptive means, means for causing relative motion between said beams of energy and said discontinuous, varying energy absorptive means, whereby, periodic variations of the energy content in said projected energy beams may be effected which are representative of pure tones comprising the fundamental frequencies and their overtones respectively and means for translating the periodically varying energy received by said receptive means from said projected energy beams into sound.

41. An apparatus for the production of sound as set forth in claim 40 further characterized in that said discontinuous, varying energy absorptive means representative, respectively, of fundamental and companion harmonic tones are arranged at right angles to the path of motion between and adjacent to said beams of energy and said discontinuous, varying energy absorptive means.

42. An apparatus for the production of sound as set forth in claim 40 further characterized in that said discontinuous, varying energy absorptive means representative, respectively, of fundamental and companion harmonic tones are arranged in the direction of the path of motion between and adjacent to said beams of energy and said discontinuous, varying energy absorptive means.

43. In an apparatus of the character described, means for producing electrical fluctuations of the fundamental and their respective harmonic frequencies with means for selectively and collectively controlling the amplitudes of the fundamentals and their harmonic fluctuations of like degree respectively in varying amounts.

44. In an apparatus of the character described, means for producing electrical fluctuations of the fundamental and their respective harmonic frequencies with means for selecting and collectively controlling the amplitudes of the fundamentals and harmonic fluctuations of like degree respectively in varying amounts with means for selectively adjusting the degree of amplitude of variation between the fundamental frequencies and their aforesaid mentioned progressively variable harmonics.

45. In an apparatus of the character described, means for producing electrical fluctuations of the fundamental and their respective harmonic frequencies, cams for selectively controlling the amplitudes of the fundamental and their harmonic fluctuations of like degree respectively.

46. In an apparatus of the character described, means for producing electrical fluctuations of the fundamental and their companion harmonic frequencies respectively, operatively associated means for attenuating the amplitudes of the said electrical fluctuations representative of their fundamental and harmonic frequencies of like degree respectively, each of said attenuating means comprising a floating bar member which is held in restraint to a substantially parallel plane of motion, a plurality of amplitude control elements for actuating each of said floating bar members.

47. A device of the character described as set forth in claim 46 further characterized in that said controlling elements are movable cams.

48. A device of the character described as set forth in claim 46 further characterized in that said controlling elements are flexible rods supported rigidly at one end, each of said rods being so proportioned as to allow a different curvature of flexure whereby the relative magnitude of said fundamentals and their harmonic fluctuations of like degree may be collectively controlled in varying amounts selectively.

49. A device of the character described as set forth in claim 43 further characterized in that each of said collective varying means is comprised of multiple element rotating arm resistors with progressively varying amounts of resistivity in each element and with each of said elements representative of the fundamentals and their harmonic fluctuations of like degree respectively.

50. A device of the character described as set forth in claim 40 further characterized by means whereby the said relative motion between said beams of energy and said discontinuous varying energy absorptive means may be made reciprocating in nature yet maintained substantially uniform in velocity, said means making effective utilization of only the substantially uniform portions of pairs of said discontinuous varying energy absorptive means in harmonic motion by suitable timing of their positions relative to said beams of energy.

51. A musical instrument provided with a keyboard encompassing the pitches of several octaves, comprising discontinuous patterns representative of the fundamental tones of the lowest octave in the said keyboard and a selection of their harmonics respectively, with means operative from the said keys of the keyboard whereby the notes higher than that of the said lowest octave may be sounded, stop means, means operative from said stops whereby the tone color of the notes sounded by the keys of the said keyboard may be varied by automatic selection and intensity control over the harmonics of the said fundamental tones of the said lowest octave represented on said discontinuous patterns thereby utilizing said discontinuous patterns which have frequencies in common with the fundamentals and harmonics of octaves higher than the lowest octave on said keyboard.

52. A musical instrument as set forth in claim 51 further characterized by shutter means for the selection of and control over the degree of effectiveness of said discontinuous patterns.

53. A musical instrument having a plurality of discontinuous patterns representative of fundamentals of the lowest octave and their harmonics respectively, a plurality of shutters each associated with a discontinuous pattern aforesaid and operated by cooperating tone color stops, keyboard keys and the attending mechanism of the said tone color stops and keyboard keys through an automatic selector and controlling system comprising a solenoid plunger linked to each of said shutters, a double acting solenoid associated with each of said solenoid plungers, each of said double acting solenoids wound with one plunger releasing coil and one plunger lifting coil, each of said coils of each said double acting solenoids operably connected to a source of electrical current by separate switches associated with the same leaf of multiple harmonic and fundamental distributing switches and in such a manner that said plunger release coil becomes de-energized just before said lifting coil is energized and vice versa, one of each of said multiple switches associated with one of each key of said keyboard said release coil and said lifting coil of each of said double acting solenoids acting on said plunger linked as aforementioned to said shutters in such a manner as to assist and oppose respectively the motion of said shutters in the direction of its full operative position upon depression of the said keys of the keyboard, each of said operable control means provided with a spring tending to keep said operable control means in full operative position, each of said solenoid plungers provided with an enlarged ending opposite to that linked to said operable shutters and provided for engagement with one bar of a plurality floating double bar parallel moving restraining mechanism, one such floating double bar restraining mechanism aforesaid provided for restraining the opening of the said shutters cooperating with discontinuous patterns representative of the fundamentals of the first octave and one for restraining the opening of each set of shutters representative of their harmonic frequencies of like degree respectively, double bar restraining mechanism operative means equal to the number of octaves on the said keyboard associated with each of said double bar restraining mechanisms, said double bar restraining mechanism operative means comprised of a catch engaging with said double bar restraining mechanism and linked through a pivoted lever to a solenoid plunger operated by a single acting solenoid connected to a source of electrical current by switches operative by all the keys of the keyboard in any one octave as representative of the fundamentals or harmonics pertaining to said octave, each of said single acting solenoid plungers utilized for the selection and control over the said harmonics of the said fundamental tones of the lowest octave represented on said discontinuous patterns such that the same patterns may be utilized for producing the fundamentals and harmonics of higher octaves and maintaining the same tone color selected for the lowest octave sounds, said single acting solenoid plungers selectively and varyingly limited in their motion by limiting means which are a part of said mechanism attending said tone color stops.

54. A device of the character described as set forth in claim 40 further characterized by the use of as many of said means for causing relative motion between said beams of energy and said discontinuous, varying energy absorptive means as there are pitches in a musical scale, with the speed of each of said means for causing relative motion proportioned substantially to that of frequencies of the pitches in the said scale respectively.

55. A device of the character described as set forth in claim 40 further characterized by the use of one or more of said means for causing relative motion between said beams of energy and said discontinuous, varying energy absorptive means with speeds which are not proportioned after the pitch frequencies of a musical scale.

56. A record for use in an electrical musical instrument of the type described, said record comprising a group of fundamental wave patterns of discontinuous form and at least one group of harmonic wave patterns of discontinuous form, both groups of patterns being of simple sine wave characteristic and further characterized by the grouping of said wave patterns of discontinuous form upon separate units, each of said units comprising one of the pitches of a musical scale respectively, its octaves and their respective harmonics.

57. A record for use in an electrical musical instrument of the type described, said record comprising a group of fundamental wave patterns of discontinuous form and at least one group of harmonic wave patterns of discontinuous form, both groups of patterns being of simple sine wave characteristic and further characterized by the grouping of said wave patterns of discontinuous form upon units comprising pitches of a musical scale, their octaves and harmonics respectively.

58. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by a set of shutters in operative connection with the keys of the said keyboard for the selection of the pitches of the notes sounded and in operative connection with the said tone color stops for the selective control of the quality of the notes sounded.

59. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by a set of shutters in operative connection with the keys of the said keyboard for the selection of the pitches of the notes sounded and by a second set of shutters in operative connection with the said tone color stops for the selective quality control of the notes sounded.

60. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by a plurality of light sources cooperating with the keys of the said keyboard and the said tone color stops for the selection of pitch and timbre control, respectively of the notes sounded.

61. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by a plurality of light responsive cells cooperating with the keys of the said keyboard and the said tone color stops for the selection of pitch and timbre control respectively of the notes sounded.

62. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by a plurality of shutters and photo cells cooperating with keys of the said keyboard and said tone color stops for the selection of the pitch and tone quality.

63. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by shutters and cooperating means with the keys of the said keyboard for the selection of the pitches desired, transient volume control, tone color variation and selecting the harmonic entrance time lag of the notes sounded.

64. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by switches and accompanying electrical circuits cooperating with the keys of the said keyboard for the selection of the pitches desired, transient volume control and selective harmonic entrance time lag of the notes sounded.

65. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by means for producing selective harmonic intensity tremolo effect in the notes sounded.

66. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by means for producing a sensibly equal volume of sound for every pitch represented by the keys of the said keyboard.

67. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by means whereby the phase relationship between said fundamentals and their harmonic oscillations respectively may be varied.

68. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized in that said wave patterns of discontinuous form are arranged in such a way that a set of said wave patterns of discontinuous form cooperate with a series of moving equidistant light transmitting openings.

69. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized in that said wave patterns of discontinuous form are each composed of one or more unidirectionally varying light transmitting portions.

70. An electrical musical instrument provided with a keyboard and tone color stops, photoelectric means for producing electric fluctuations comprising a group of fundamental wave patterns of discontinuous form and at least one group of harmonic wave patterns of discontin- 71. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by means for continuously variable volume control.

72. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by means for increasing or diminishing the volume of the sound produced in steps of sensibly equal gradations.

73. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by means associated with the keys of the keyboard for varying the increment and decrement of the wave amplitude envelopes as the notes are sounded.

74. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by means for varying the increment and decrement of the wave amplitude envelopes of the harmonics of the musical notes sounded.

75. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by a light source, opposing parabolic reflectors and a photo-cell.

76. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by multiple filament lamps, a lens system, a parabolic reflector and a photo cell.

76. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by a light source and a plurality of photo-cells.

77. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized by a plurality of light sources, elliptical reflectors and a photo cell.

78. An electrical musical instrument provided with a keyboard and tone color stops, photoelectric means for producing electric fluctuations comprising a group of fundamental wave patterns of discontinuous form and at least one group of harmonic wave patterns of discontinuous form, both groups of patterns being of simple sine wave characteristic and further characterized in that said wave patterns of discontinuous form are arranged circumferentially, photo electric cell means axially placed in reference to said wave patterns of discontinuous form, light source axially placed in reference to said wave patterns of discontinuous form, optical means for projecting light from said light source through said wave patterns of discontinuous form and upon the sensitive surface of said photo-electric cell means.

79. An electrical musical instrument provided with a keyboard and tone color stops, photoelectric means for producing electrical fluctuations comprising a group of fundamental wave patterns of discontinuous form, and at least one group of harmonic wave patterns of discontinuous form, both groups of patterns being of simple sine wave characteristic and further characterized in that said wave patterns of discontinuous form are arranged circumferentially, axially operative cylindrical shutter bands and other shutter means, also axially operative, cooperating with said wave patterns of discontinuous form.

80. A musical instrument provided with a keyboard encompassing the pitches of several octaves, comprising discontinuous patterns each representative of one of the fundamental tones of all the several octaves represented on the said keyboard and one of a selection of their harmonics respectively, stop means, means operative from said stops whereby the tone color of the notes sounded by the keys of the said keyboard may be varied by selection and intensity control over the fundamental tones and their harmonic frequencies of like degree respectively.

81. An electrical musical instrument in which alternating current is used to produce musical tones, a manual including a number of different keys, a set of switches operated by each key, a plurality of sources of alternating current comprising discontinuous patterns, electrical connection for each of said sources to said switches, such that switches of different sets are connected to a single one of said sources.

82. An electrical musical instrument in which alternating current is used to produce musical tones, a manual including a number of different keys, a set of switches operated by each key, a plurality of radiant energy emitters and electrical connection for each of said radiant energy emitters to said switches, such that switches of different sets are connected to a single one of said radiant energy emitters.

83. An electrical musical instrument in which alternating current is used to produce musical tones, a manual including a number of different keys, a set of switches operated by each key, a plurality of shutters, electrically operative means for opening and closing each of said shutters and electrical connection from each of said shutter control means to said switches, such that switches of different sets are connected to a single one of said shutter operative means.

84. An electrical musical instrument in which alternating current is used to produce musical tones as set forth in claim 83 further characterized by a second switching means comprising a single switch operated by each of said keys of the manual, a second group of electrically operative means for limiting the amount of possible opening of said shutters, such that sets of said shutters are operatively connected to a single one of said second set of electrically operative shutter opening limiting means and electrical connection from each of said shutter opening limiting means to said second switching means, such that switches of said second switching means representing octave groups of said keys of the manual are connected to a single one of said shutter opening limiting means.

85. An electrical musical instrument in which alternating current is used to produce musical tones, a manual including a number of different keys, a set of mechanism operated by each key, a plurality of shutters and operative connection from each of said shutters to said mechanism, such that mechanism of different sets are operatively connected to a single one of said shutters.

86. An electrical musical instrument in which alternating current is used to produce musical tones, a manual including a number of different keys, a set of mechanism operated by each key, a plurality of patterns, pattern cooperative means for each of said patterns and operative connection from each of said pattern cooperative means to said mechanism, such that mechanism of different sets are operatively connected to a single one of said pattern cooperative means.

87. A record for use in an electrical musical instrument of the type described, said record comprising a group of fundamental wave patterns of discontinuous form and at least one group of harmonic wave patterns of discontinuous form, both groups of patterns being of simple sine wave characteristic.

88. An electric musical instrument provided with a keyboard and tone color stops, photoelectric means for producing electrical flunctuations comprising a group of fundamental wave patterns of discontinuous form and at least one group of harmonic wave patterns of discontinuous form, both groups of patterns being of simple sine wave characteristic.

MERLIN DAVIS.